(12) United States Patent
Maddock

(10) Patent No.: US 6,466,369 B1
(45) Date of Patent: Oct. 15, 2002

(54) PORTABLE VISUAL DISPLAY DEVICE WITH A COLLAPSIBLE PRESENTATION SCREEN

(76) Inventor: Alan Maddock, 14, rue de Villarceau, Nozay, F-91620 (FR)

(*) Notice: Subject to any disclaimer, the term of this patent is extended or adjusted under 35 U.S.C. 154(b) by 0 days.

(21) Appl. No.: 09/623,455
(22) PCT Filed: Mar. 11, 1999
(86) PCT No.: PCT/GB99/00734
§ 371 (c)(1),
(2), (4) Date: Dec. 26, 2000
(87) PCT Pub. No.: WO99/46932
PCT Pub. Date: Sep. 16, 1999

(30) Foreign Application Priority Data

Mar. 11, 1998 (GB) .............................................. 9805198

(51) Int. Cl.⁷ .......................... G03B 21/56; G03B 27/22
(52) U.S. Cl. ...................... 359/460; 359/461; 359/443; 359/451; 359/449
(58) Field of Search ................................. 359/461, 443, 359/445, 451, 449, 460

(56) References Cited

U.S. PATENT DOCUMENTS 2,827,955 A * 3/1958 Hurley ........................ 160/369
5,579,180 A * 11/1996 Geller ......................... 359/847
5,622,419 A * 4/1997 Holder et al. ............... 353/119

* cited by examiner

Primary Examiner—Russell Adams
Assistant Examiner—Magda Cruz
(74) Attorney, Agent, or Firm—Jacobson Holman, PLLC

(57) ABSTRACT

A colapsible rear projectrion screen assembly for a portable visual display device. Embodiments are presented that include a flexible screen supported by a surrounding rigid screen that collapses by a ssimple folding movement for easy transport while also removing any risk of opticql or physical damage to the screen member material in the collapsing process.

20 Claims, 20 Drawing Sheets

2B

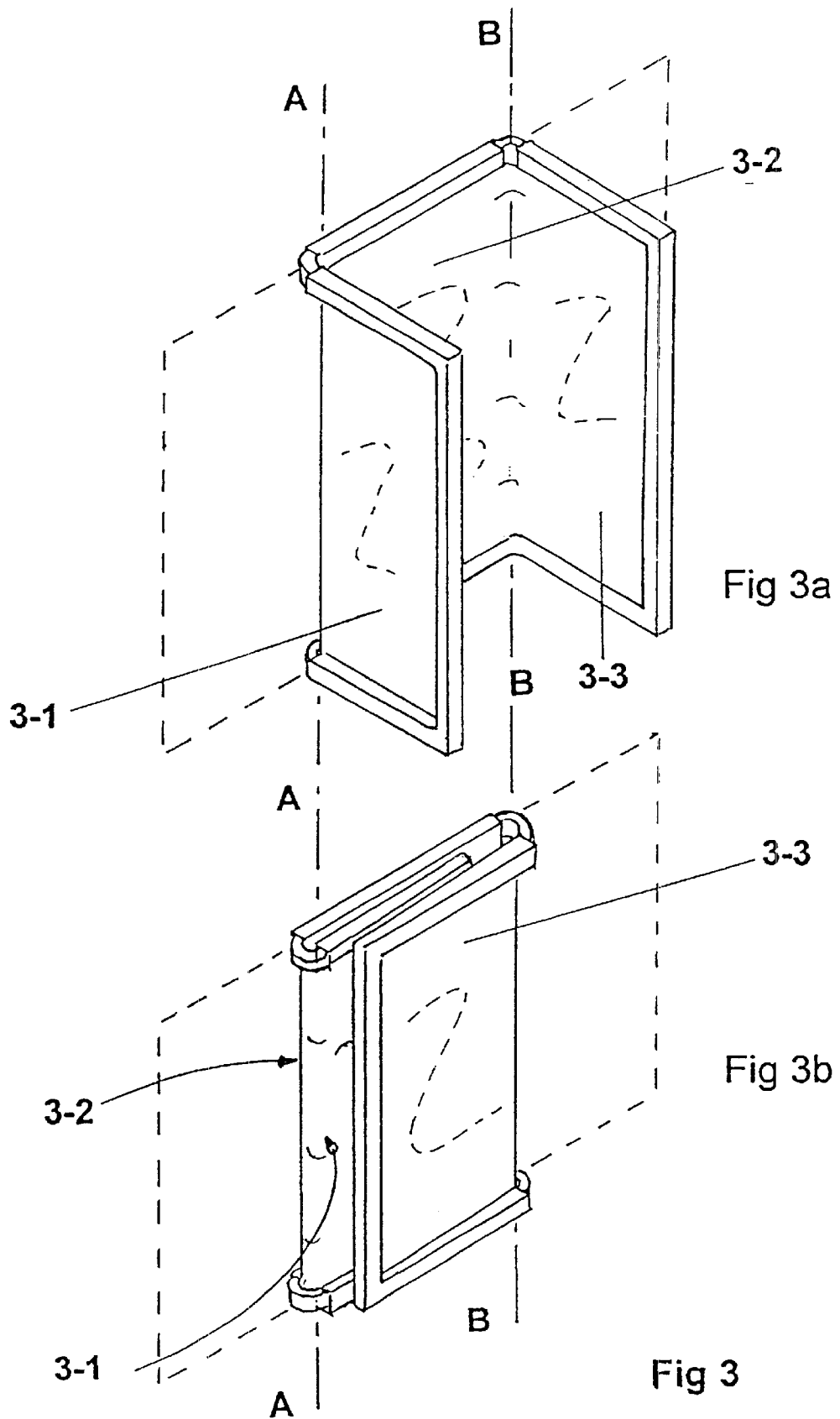

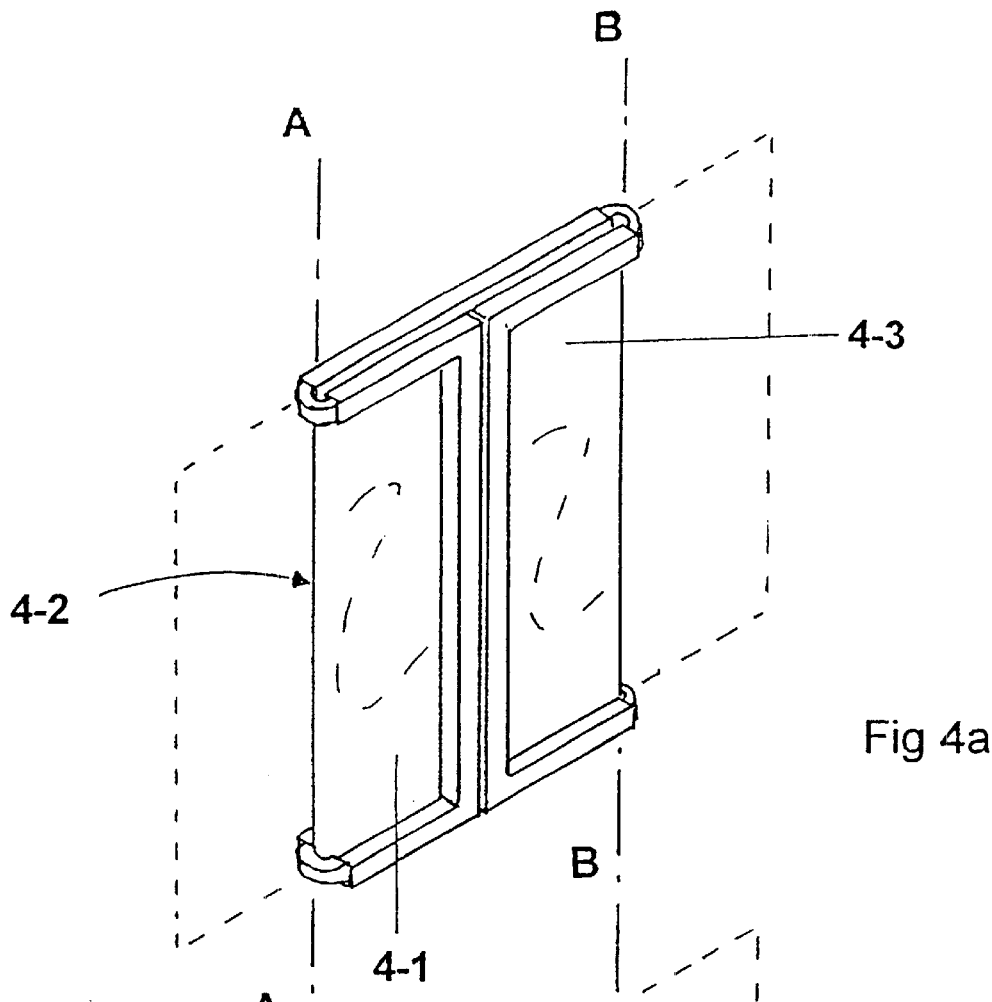
Fig 4a
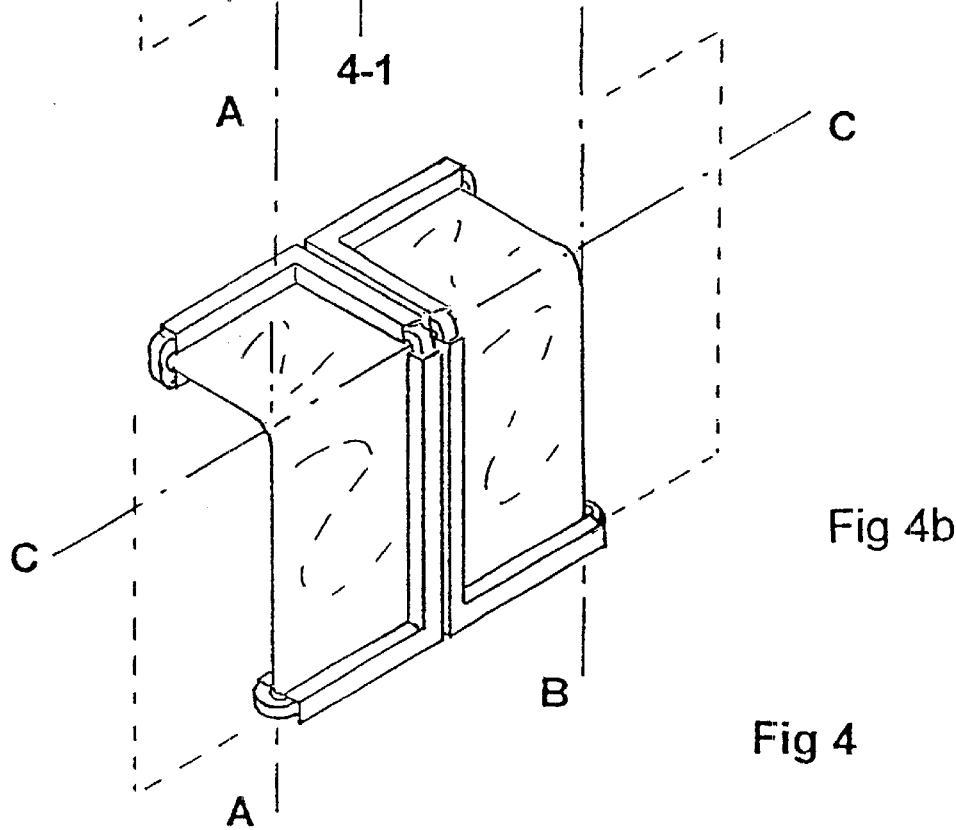
Fig 4b
Fig 4

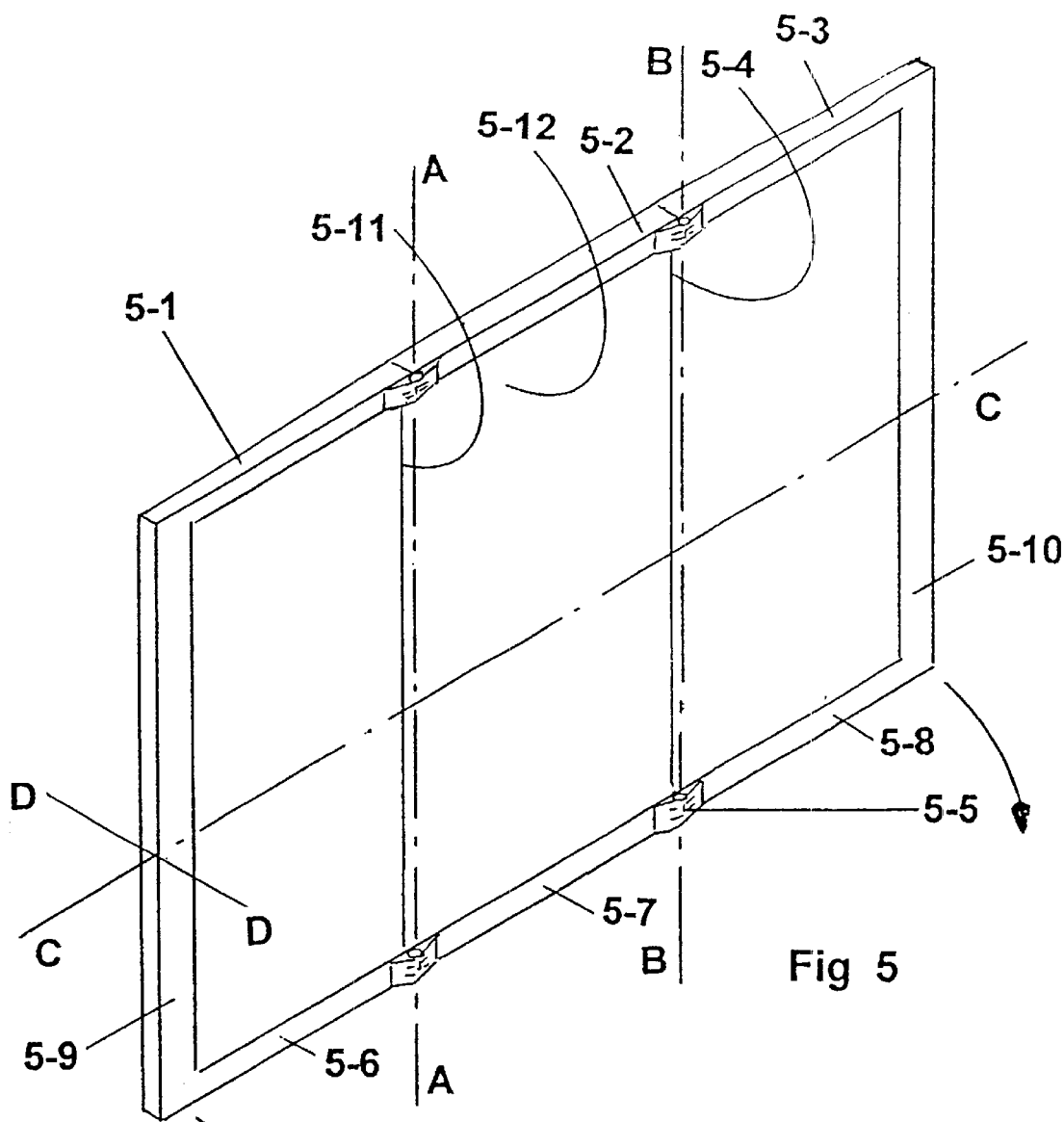
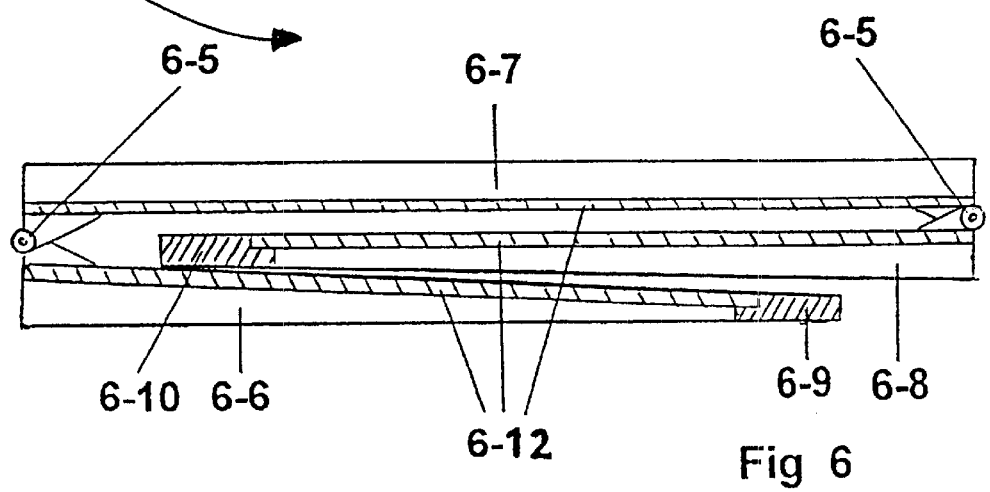
Fig 5
Fig 6

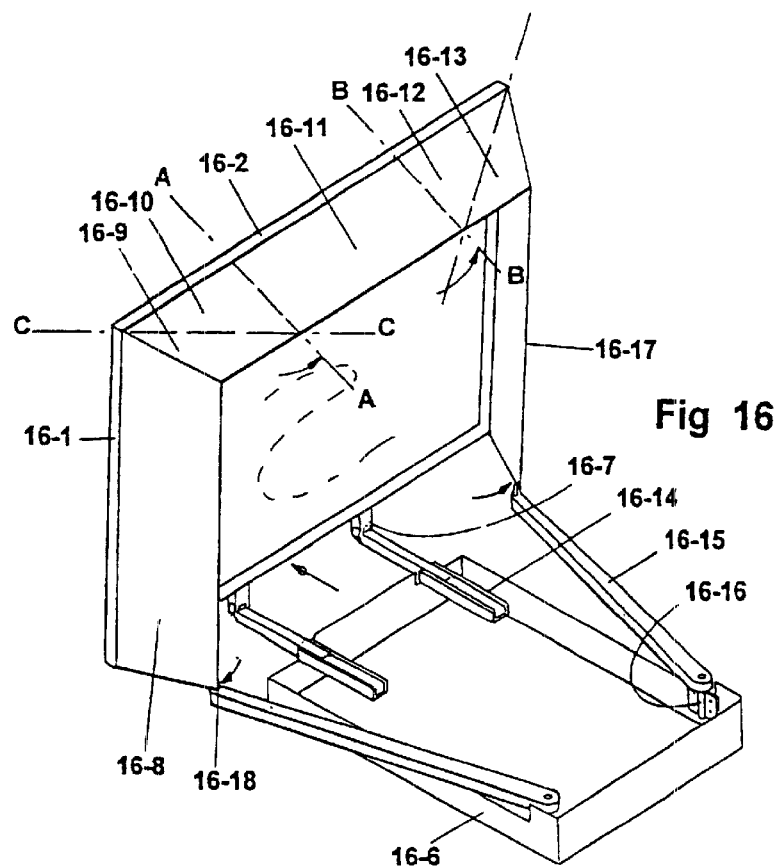
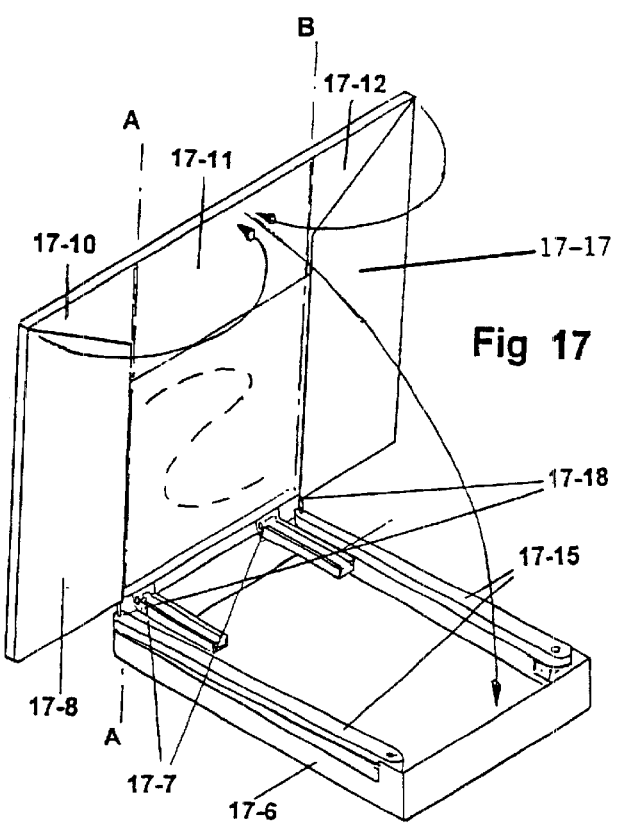

PORTABLE VISUAL DISPLAY DEVICE WITH A COLLAPSIBLE PRESENTATION SCREEN

BACKGROUND OF THE INVENTION

1. Field of the Invention

The invention relates to a presentation screen for the presentation of still or moving visual images such as pictures, text or data to a group or a number of people in typical and everyday business, training, education, promotion or exhibition environments. The screen is of the diffusion type, using diffusion means for displaying the images on the front viewing surface. The screen may collapse into a smaller configuration such as to significantly increase its portability as required for being readily moved from room to room or travelling from place to place. The field of the invention also relates to the various forms of art that may be employed in its various embodiments as, or as part of, a visual display device.

The field of this invention is that of flexible, rear projection screens and is not intended to include front (i.e. reflective) display screen applications, active display screens or rigid screens.

2. Description of Prior Art

Visual Display by means of cathode ray tube (CRT) devices is commonly used for computer monitors and televisions and can have relatively large screens (up to 40 inch, 1 meter) but these are bulky and very heavy and thus not truly portable.

Visual display by rear projection such as in TV units can provide a large screen area but such devices are not yet common and again the devices are large and bulky and thus not truly portable.

Visual display devices using a Liquid Crystal Display (LCD) are common particularly in laptop computers and are highly portable but their limited screen size (14 inch, 35 cm) makes them unsuitable for presentational use involving several persons viewing the screen simultaneously in comfort.

Various other displays are appearing such as plasma screens that are large screen (up to 42 inch currently, 105 cm) and that are almost flat for hanging on a wall, but again are relatively heavy and bulky so not truly portable.

Visual display by large screen front projection means is popular in business and at home. Use may be in circumstances of a fixed set-up in a special room or for use in a portable or travelling manner. However the latter requires some preparation—possibly in front of a waiting client or audience. Depending on circumstances it may require suitable lighting conditions, a screen and the physical space to the projector screen to be available. This can be a further disadvantage when associated with use where visiting in a business environment since it may be considered professionally "intrusive", to impose these requirements on a client even for informal presentations.

Many visual display devices have tried to employ the advantages of the systems above within a more or less portable package. In general these are subject to the limitations either that the viewable screen is smaller than the case within which it is carried, or where the display screen is larger than the case and in some way disassembled for storage and carriage, use of the screen requires user intervention to then assemble the screen and attach it to other required elements which is again an inconvenience and takes time.

There are known methods for the collapsing of seamless front projection screens that employ flexible screens which fold away for storage. However these collapsing methods have not generally proved applicable in translucent diffusion applications for the reasons set out below.

Front Projection screens are not translucent and therefore typically consist of a reflective front surface with a reinforced backing that provides considerable physical "body" to the material such that it does not require to be stretched to operate or reflect light uniformly—although it may be hung or stretched to stay in an approximately planar condition. Further, physical damage such as creases or folds in the screen surface are not highly critical to the optical performance as no light passes through the-material.

Flexible screens suitable for use in say a portable rear projection application, are by necessity of their unique optical transmissive and controlled diffusive requirements, very thin, of a totally different translucent and very homogeneous material without any reinforcing layer, must be under at least minimal tension and physical distortion and non-planarity must be avoided. Further, any crease or fold of the material (even if not still physically present or not) may cause optical distortion to the passing light and images or cause "rainbow effect" or "white spots" and result in very irritating screen flaws to a viewer.

As a result, the technology of the screen, its material and also the optical and physical requirements in use are very different from those applicable to reflection screens. Further the demands of preserving the screen optical qualities and screen longevity (especially in required highly repeated or rapid opening and closing actions) are much more critical in "fit for purpose" concerns. In consequence particular difficulties are encountered in developing collapsible screens of this type, and it has not been generally possible to apply collapsible concepts from the reflection screen art to screens designed for the application of the present invention.

Specifically, relevant prior art is list here:

D1: U.S. Pat. No. 4,323,301 (Spector D.) Apr. 6, 1982 A collapsible and portable flexible screen erected by inflating by gas cartridge a tubular rectangular loop.

D2: EP-A-0 424 074 (Failla S.) Apr. 24, 1991 Segmented rigid display screens that are collapsible by hinging/sliding means.

D3: EP-A-0676 893 (Projectavision Inc) Oct. 11, 1995 Cabinet for portable rear-screen television projector that features a light shield.

D4: U.S. Pat. No. 2,827,955 (Hurley A.) Mar. 25, 1958 Folding Motion Picture Screen (front projection only).

OBJECTS OF THE INVENTION

Accordingly:

It is an object of the present invention that it generates the viewable optical images on the front viewing surface of the presentation screen by the diffusion of the light comprising of images that originate from a light source at a distance to the rear of the front viewing surface.

It is an object of the present invention that it provides a visual display screen with a viewable surface area that is sufficiently large such that it may be readily and comfortably viewed by several people.

It is an object of the present invention that it may be viewed in typical in-door environments without need for further space or apparatus (other than if an external media source is required).

It is an object of the present invention that the screen assembly is collapsible such that the viewable screen area is considerably larger when in an open condition than its largest area of encumbrance when in a closed condition thus providing a portable nature suitable for carrying from room to room or for travelling from place to place.

It is an object of the present invention that it provides a visual display screen that presents a joint-less and essentially planar screen to a viewer situated in front of the viewing surface.

It is a desirable object of the present invention that it may be considered as "self-collapsing" that is to say that it can be deployed or collapsed as an integral assembly whereby the screen assembly does not require user intervention such that any parts be removed, added, attached, detached, re-located, tightened or loosened and requiring only a simple and direct opening or closing action.

It is an object of the present invention that it employs specific means or methods such as jointing means, mechanisms, elements, materials, shapes or geometrical configurations that are intended by their presence or operation or action to prevent or reduce any damage or deterioration of a physical or optical nature that may occur to the viewable screen area due to any single or occasional or often repeated action or movements or sustained positions of the collapsible screen assembly.

It is a desirable object of the present invention as, or as part of, a portable visual display device, to be readily and rapidly deployable to a useable state within a set-up time of several seconds.

It is a desirable object of the present invention as, or as part of, a portable visual display device, that it comprises true portability in a hand portable case.

Briefly stated, the objects of the present invention relate to a portable screen for presentation purposes that can be used as, or as part of, a visual display device that is practically and commercially suitable in its various embodiments for making presentations of a business, professional, promotional, marketing, advertising, communication, training or educational nature to many people situated in normally lit indoor environments such as in typical business environments, meeting rooms or offices, classrooms, lecture-rooms, exhibition halls, point-of-sale areas, gymnasiums etc., A possible embodiment of the invention is as an optional accessory to conventional projectors.

SUMMARY OF THE INVENTION

In accordance with the principles of the present invention, the foregoing and other objects are achieved by a screen assembly composed a surrounding rectangular frame member to which is permanently attached a viewable screen member composed of a material that is attached and supported within the said frame member. The screen member acts as a display screen by the diffusion of images on a front viewing surface, the images being produced by light-imaging elements or devices located to the rear of the forward facing viewing surface. The screen assembly includes jointing means permitting it to move as an assembly between two conditions such that it can be rapidly opened and used as a display device or rapidly collapsed into a closed condition that represents a much smaller configuration suitable for ready transport or storage.

Accordingly, a screen assembly for a portable visual display device comprises a frame member to which is permanently attached a screen member for the presentation of visual images on a front viewing surface to persons located on a viewing side by diffusion of optical images created to the rear of this front viewing surface (which is to say images that may originate from a distance from the rear of the screen, but which excludes reflecting screen front projection) wherein the screen assembly comprises at least two screen and frame sections connected by jointing means such that the screen assembly is deployable into a closed condition in such a manner as to significantly reduce the screen member area when in the closed condition.

Thus the screen assembly is collapsible such that the viewable screen area is considerably larger when in an open condition than its largest area of encumbrance when in the closed condition. The resulting assembly is potentially provided with a portable nature suitable for applications involving carrying from room to room or travelling from place to place.

It may be desirable for the screen to have a joint-less configuration on its viewable surface and to this end the assembly uses a screen member of a flexible nature, with the screen member comprising a flexible material.

The material of the screen member may be of a passive translucent nature suitable for the diffusion of optical images projected through the screen from a projection device located to the rear of the screen member.

The screen assembly may be composed of a screen member retained within a screen frame member having jointing means thereon (such as hinges or the like) such that any section of the screen assembly may fold about one or more axes determined by the jointing means in such a manner as to significantly reduce the screen member area when in the closed position.

The screen assembly and jointing means are preferably so configured that a screen and frame section (as determined by the frame jointing means such as hinges) may rotate or fold about the jointing means such that a screen section through approximately 180 degrees into a flat position adjacent to other screen and frame sections.

The screen assembly and jointing means are preferably so configured that the screen and frame sections may rotate or fold about the jointing means such that a screen section lies substantially perpendicular to another or several other screen and frame sections.

For example, the screen and frame sections may rotate by jointing means about the frame axis enabling outer screen sections to rotate so that the said outer sections are perpendicular to the remaining screen sections when in the closed condition.

The screen and frame sections of the screen assembly may be so arranged that sections of the screen assembly are enabled to rotate about at least two axes one of which is not parallel to any other axis, or at least two axes of which at least two are essentially parallel, or about two parallel axes and a third perpendicular axis.

The screen frame member may be provided with screen frame supporting panels or members that are attached by a jointing means to the edges of the screen frame such as to provide mechanical support to the screen assembly when in the open condition and to lie flat with the screen member when in the closed condition. A plurality of screen frame supporting panel members may be provided connected by jointing or hinging means. Some or all of the axes of rotation of the jointing means between frame supporting panels are preferably configured to fail essentially parallel and co-incidental or adjacent to axes of the jointing means of the screen assembly when the frame support members are closed flat against the screen member.

The frame supporting member or panel or multiplicity thereof is or are attached by a jointing means to the frame member and which lies flat and adjacent with the screen member when the screen assembly is in the collapsed position and deploys in such a manner as to provide substantial mechanical support to retain the screen assembly in the upstanding position and/or to retain the frame elements in the fully open condition for viewing of the screen images.

It is a preferable feature of the aforesaid screen assembly and jointing means that they are together configured to avoid or reduce any optical or physical damage or deterioration to the viewable surface of the material of the screen member that may be caused by any position thereof or due to any repeated opening or closing actions.

The jointing means may be configured such that they provide axes of rotation that are virtual or pseudovirtual or are axes that move out of the physical section of the frame elements or jointing means.

Another possible member is a base member that can be placed on a flat surface and to which the screen assembly and/or any present frame supporting member can be attached such as to be supported in the upstanding position upon or by the base member. This base member may be configured as an enclosure preferably with a lid into which the said screen assembly can be stored and secured for transport. The base member if constructed as an enclosure may also contain a media source to store the images.

Thus, the invention further comprises a portable visual display device comprising a screen assembly in accordance with any preceding claim wherein the screen assembly is mounted to a base member suitable for seating on a flat surface such that the base member provides support to retain the screen assembly in an upstanding position when in the open condition.

Within the context of its use as, or as part of, a visual display device then another possible member is a light-imaging means or device capable of creating the display images so.

Another possible member is a projection device whereby the images on the front viewing surface of the screen are generated by rear projection of the images through a translucent screen material suitable for such purposes. The projection device may be utilised as an integral, removable or attachable unit and may have associated with it a mirror or mirrors such that the optical light path from the projector can be folded back to thus reduce the physical pat h distance from projector to screen member.

The apparatus may optionally be provided with a light-shield member that may be used with the aforesaid projection device to ensure that ambient light cannot impinge on the rear side of the screen member to the detriment of image quality while the screen assembly is operational. This light shield is preferably also collapsible into a much smaller closed condition either with or separately from the screen assembly.

In a preferred arrangement the light shield is deployable in the open condition so as to be adjacent or attached to the upper horizontal and the upstanding frame elements of the screen assembly and to extend downwards and rearwards towards the base member.

The base member may be configured as an enclosure with a lid such that the enclosure lid when open acts as a part of the light shield.

The light shielding member may be jointed to the screen assembly such that it is collapsible from the open and deployed condition to a collapsed condition adjacent to the screen assembly, and preferably the light shielding member or any part or element thereof is jointed to a screen frame edge and acts as a frame supporting panel such as provide mechanical support to the screen assembly when in the open position. Also the light shielding member or any part or element thereof may act as a fold guide element that can be brought into a position adjacent and parallel to the axis of rotation of the screen assembly sections such as to act as a support or guide to the screen member material as it wraps around the fold guide elements during the rotation of the screen assembly sections during the closing actions and when in the closed condition.

A particular embodiment of the invention utilising a projection device can form a configuration that enables the screen and light shield member to be attached together by jointing means enabling them to open and close integrally as a single entity and to preferably collapse into the aforesaid enclosure. The light shielding member may be configured to collapse in a secondary collapsing movement in co-operation with the collapsing movement of the screen assembly such that the combined device collapses to a closed condition, and in such an arrangement the axes of collapsing of the light shielding member are preferably parallel and adjacent or co-incidental.

It is desirable that each or all of the aforesaid members or elements may be considered as "self-collapsing", that is to say can be deployed without need for user intervention to deploy or collapse the assembly or combined assemblies other than by a direct action only to open or close (or short series of simple actions in the case of combined assemblies) or by actuation of a mechanical or motorised drive to perform the same.

Other alternative features of the invention will be apparent from the appended claims.

BRIEF DESCRIPTION OF THE DRAWINGS

FIG. 3 is a perspective view of two embodiments including two axis of rotation of which both are, in the examples shown, parallel to one another.

FIG. 4 is a perspective view of two embodiments including two axis of rotation of which both are parallel to one another and whereby the outer sections of the screen assembly are not overlapping.

FIG. 5 shows a perspective view of a general screen assembly utilising a rigid screen member in accordance with prior art arrangements.

FIG. 6 is a cross-sectional plan view of the general assembly of FIG. 5 in accordance with prior art arrangements.

FIG. 16 is a perspective view similar to FIG. 15 whereby frame support panel members are shown.

FIG. 17 is a perspective view similar to FIG. 16 that shows the screen assembly retracted back to be adjacent to the front edge of the base member.

DETAILED DESCRIPTION OF THE INVENTION & ILLUSTRATED EMBODIMENTS

Figure 1:
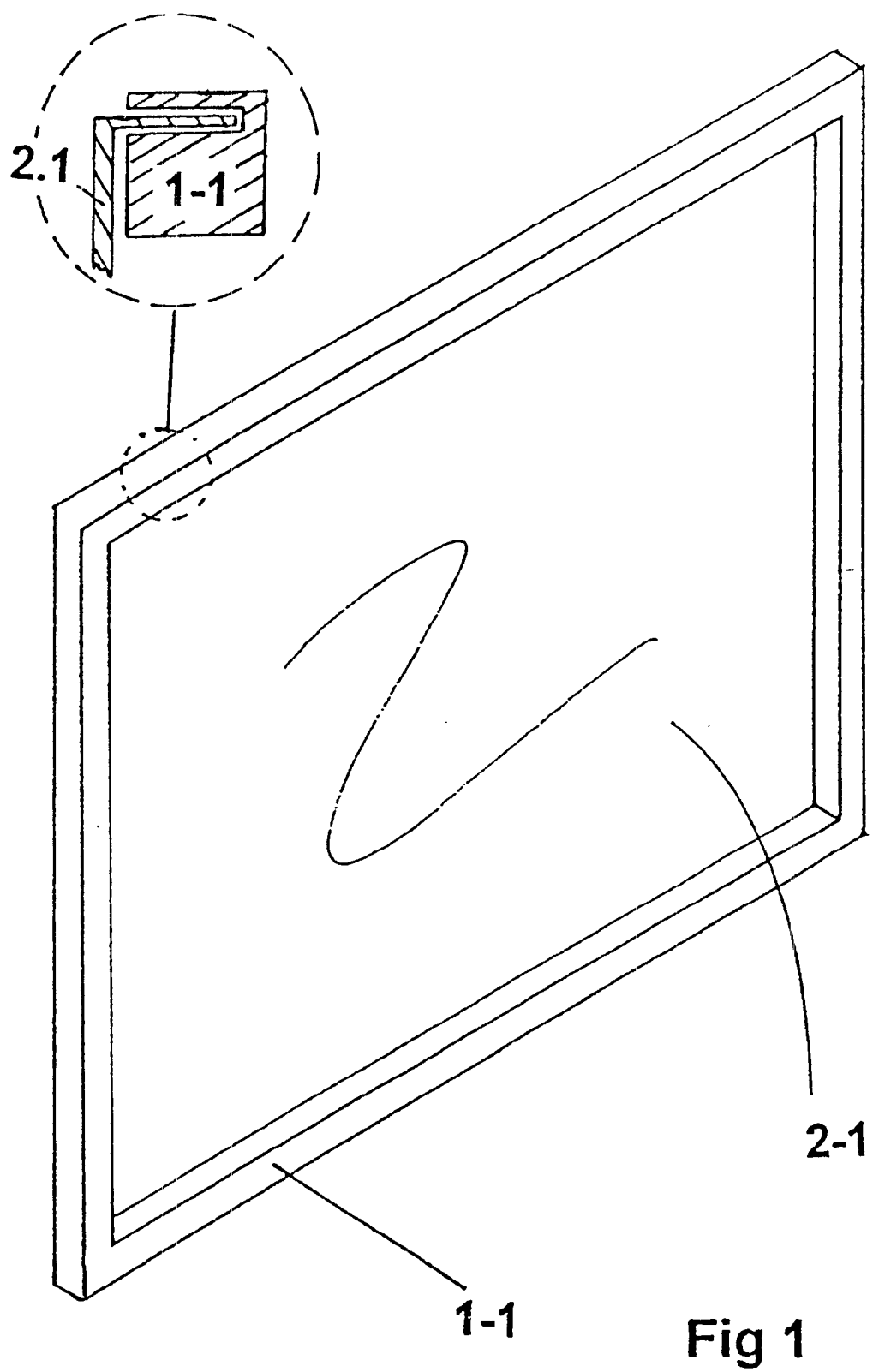
FIG. 1 is a perspective drawing that shows an example of a general visual display screen assembly.

FIG. 1 is a perspective drawing that shows an example of a general visual display screen assembly wherein a rectangular supporting frame member (1-1) supports the screen member (1-2) that is permanently attached (except for replacement purposes) to the surrounding frame member. The screen member is held to be flat within the frame member (1-1) by its being attached to the four sides of the frame member. The frame member can be considered to comprise the two upstanding side elements and the upper and lower horizontal elements. A magnified cross-section of the frame and screen members is shown for clarity and illustrates a simple example attachment method using a push-in mounting of the screen member into a slot in the frame member.

The material of the screen member may be of a passive translucent nature suitable for the diffusion of optical images projected through the screen member from a projection device located to the rear of the screen member.

Embodiments of a collapsing screen assembly based on the general assembly shown in FIG. 1 can be configured to have many different closed configurations that may include single or multiple methods of movement such as linear or rotational movement or any combination thereof and whereby rotational movement may include single or multiple axis of movement that may or may not be perpendicular or may or may not be parallel to each other. Further, in the case of rotational movement, the axis of rotation may be about a physical axis or a virtual axis of rotation and may permit rotation through a range of angles.

Possible embodiments of a collapsing screen assembly are demonstrated by way of example but are not limited to the configurations as shown in the following FIGS. 2 through 4 wherein the possible closed conditions are shown and the original open position of the screen assembly is indicated by a dashed line. Arrows indicating the direction of movement are omitted as this is considered obvious however the screen member surface is indicated by a light dashed "Z" shape to clearly identify its presence.

The following FIGS. 2, 3 & 4 are by way of illustration of the possible open and closed configurations as may be applicable to screen material of a flexible nature.

Figure 2B:
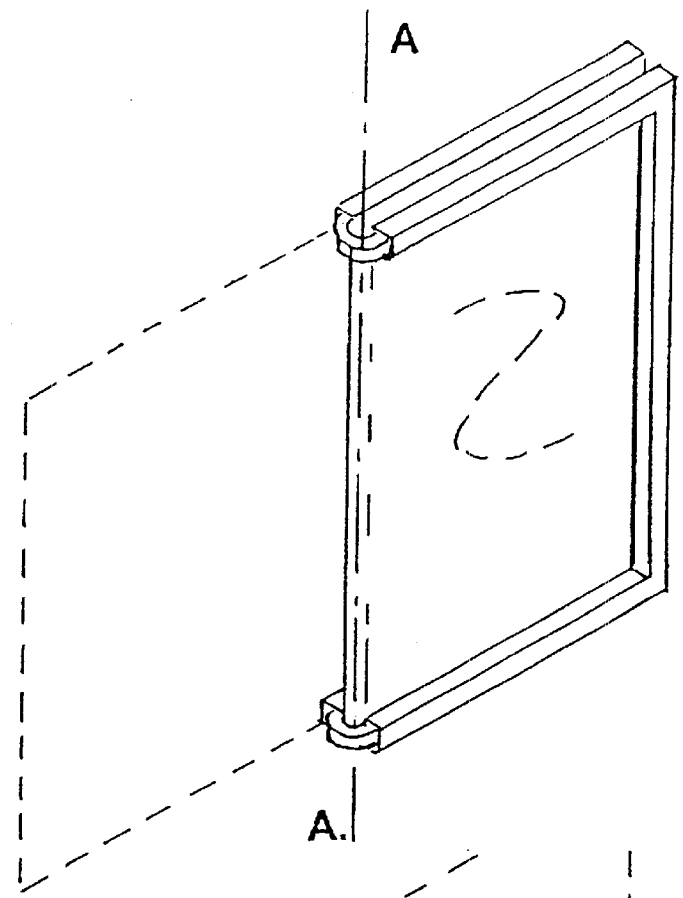
FIG. 2 is a perspective view of two embodiments including a single axis of rotation.
Figure 2A:
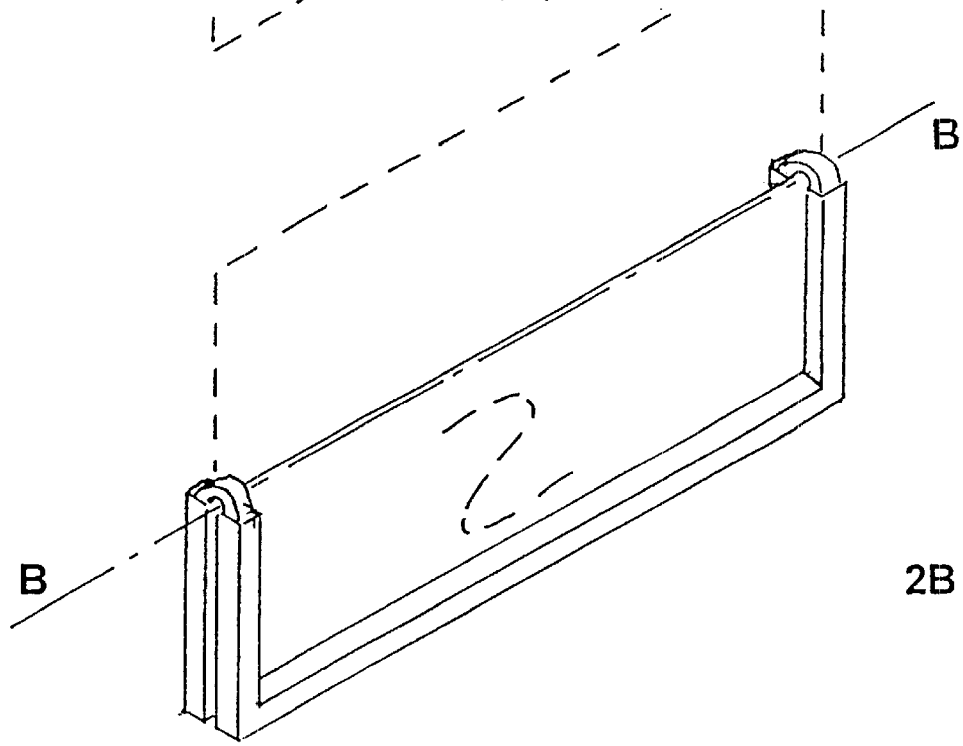

FIG. 2 is a perspective view of two similar embodiments with a collapsing action about a single axis of rotation. The upper shown embodiment (FIG. 2A) has an upstanding axis of rotation (A—A) and the lower shown embodiment (FIG. 2B) a horizontal axis of rotation (B—B).

FIG. 3 is a perspective view of two similar embodiments with a collapsing action about two parallel axis of rotation. The upper shown embodiment (FIG. 3A) is an example with the outer sections of the screen assembly (3-1) & (3-3) rotated to 90 degrees to the central section (3-2)—such a configuration may be used where the screen assembly sections are required to be closed to a position adjacent to the sides and top of an enclosure. The lower shown embodiment (FIG. 3B) is. similar to the upper shown embodiment except that the outer sections (3-1) & (3-2) rotate through approximately 180 degrees between open and closed conditions. As a result said sections (3-1) & (3-3) overlap such as to be partially super-imposed in the closed condition so as to lie relatively flat. Such a configuration may be preferable for wider screen formats.

FIG. 4 is a perspective view of two similar embodiments with a collapsing action about two axes of rotation of which both axis are parallel to one another and whereby the outer sections of the screen assembly are not overlapping in the closed condition. The upper shown embodiment (FIG. 4A) is an example wherein the outer sections of the screen assembly are rotated by 180 degrees. The lower shown embodiment (FIG. 4B) is similar to the upper shown embodiment but with a further horizontal axis of rotation (C—C) traversing the upstanding frame side elements and thus permitting the upper section of the screen assembly to rotate to 90 degrees (as shown) relative to the lower section or could be rotated further to an angle of 180 degrees (shown in a later example).

Referring to FIGS. 2 through 4, it can be understood that in all of the embodiments presented either side of the screen element could be considered as the front or the rear side from the point of view of viewing and that the operations of the embodiments are also valid had the axis been located at a disposition at 90 degrees to those shown.

The following FIGS. 5 & 6 are out-with the scope of this invention as it comprises a rigid or semi-rigid screen material but is shown to illustrate the difficulties of converting the prior art relating to rigid screen technologies to flexible screen use.

FIG. 5 shows a perspective view of a screen assembly in accordance with prior art arrangements with a rigid frame member composed of the upstanding frame elements (5-9) and (5-10), the lower frame elements (5-6), (5-7) and (5-8), and the upper frame elements (5-1), (5-2) and (5-3) and having inset a screen member (5-12). The outer screen assembly sections may rotate about the axis (A—A) and (B—B) as indicated by the arrows due to jointing means (5-5) between frame elements (5-1 to 5-2), (5-2 to 5-3), (5-6 to 5-7) and (5-7 to 5-8) and whereby there is a physical joint in the screen at the positions shown (5-4) & (5-11).

FIG. 6 is also in accordance with prior art arrangements and is a cross-sectional plan view of the assembly of FIG. 5 along the plane defined by axis (C—C) & (D—D) in FIG. 5. The rigid screen elements (6-12) are shown with the two outer sections rotated through approximately 180 degrees to be adjacent to the central section (6-7) as also previously shown in FIG. 3B. The superimposition is aided by use of tapered frame elements (6-6), (6-8), (6-9) and (6-10) and jointing means (6-5) of different offset at each side. This configuration is simple and is suitable for all screen formats and particularly wider screens (such as 16/9 formats) but has the disadvantage of having joint lines on the viewable screen area.

The subsequent figures refer to embodiments that avoid such joints on the viewable screen face by the use of a seamless flexible screen.

In reference to the collapsing actions shown in the basic embodiments represented in FIGS. 2 through 4, it will be evident that further refinements are desirable to assure longevity of a flexible screen member under repeated opening and closing actions. Such refinements are illustrated in the embodiments shown in FIGS. 7 through 13.

Figure 7:
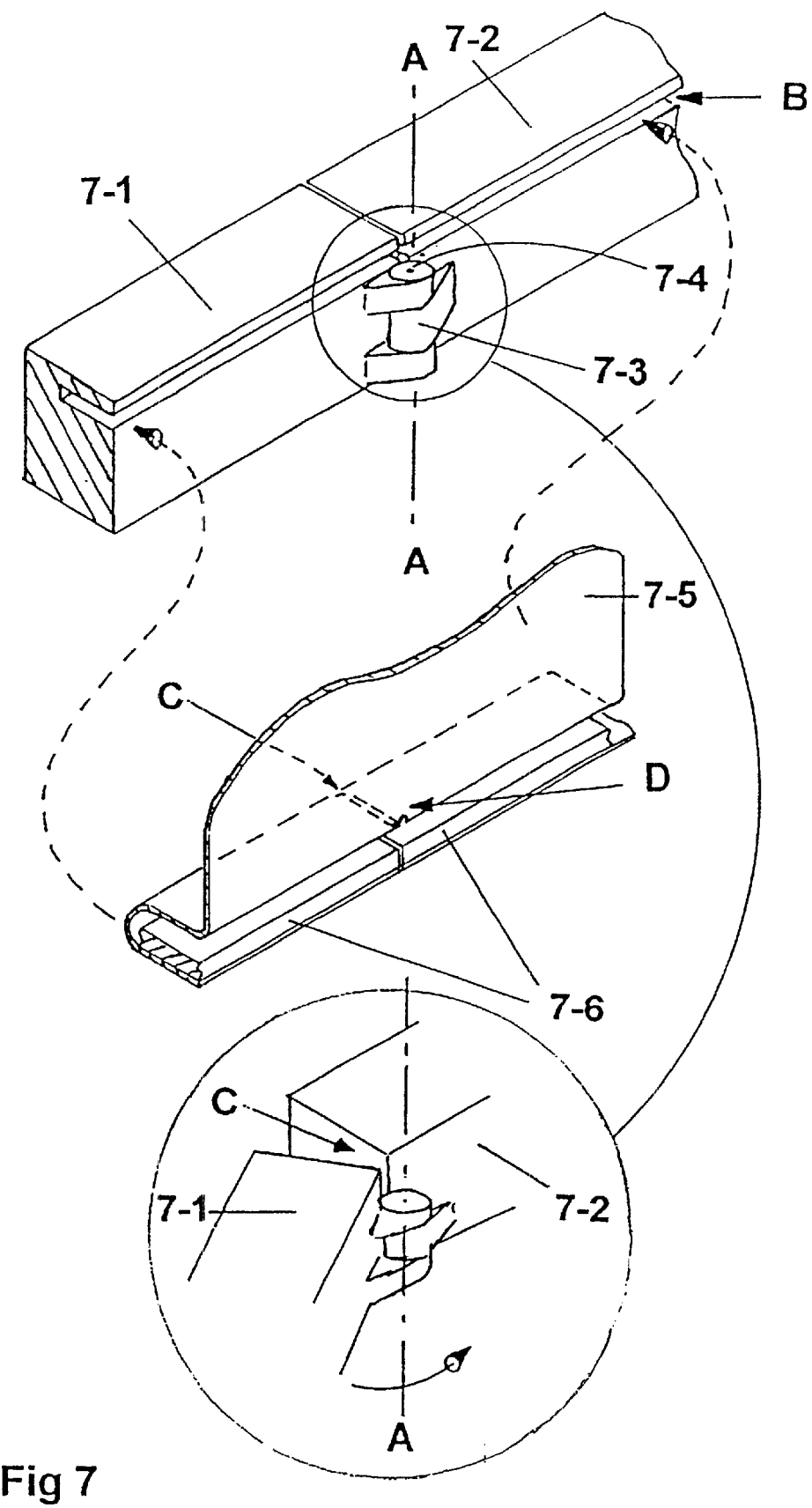
FIG. 7 is a cut-away perspective of a possible simple embodiment of a jointing means.

FIG. 7 is a cut-away perspective that shows by way of example a possible simple embodiment of a jointing method wherein a section of the lower frame member comprises of frame elements (7-1) & (7-2) that are connected by a simple hinge mechanism element (7-3) along the axis (A—A). A slot exists in the frame element and is situated above hinge (7-3) at the position indicated by arrow (B). The flexible screen member (7-5) is of a flexible material that is attached to screen attachment members (7-6) and together can then be attached to the frame via the slot at (B) and locked in place by any appropriate means (not shown in the figure for clarity). The screen member (7-5) extends upwards towards the top of the screen member where the upper frame elements (not shown) contain the opposing hinge elements situated on the same axis (A—A). The upper elements are arranged in a similar but inverted manner. It can therefore be noted that the screen member in this case does not extend across the hinge elements.

In reference to FIG. 7, there is a potential disadvantage to this configuration in terms of longevity and reliability as there is by necessity a break in the attachment members (7-6) and the screen member (7-5) at the position (D) to enable them to open with the frame elements (7-1) & (7-2). This creates a localised stress and possible fatigue point at position (D) of the screen member that may cause deterioration or tearing of the screen due to repeated opening or closing and/or by the additional stress caused by the increased tension of the screen member at position (D) as the two elements (7-1) & (7-2) initially separate longitudinally to commence their rotation to the closed position. This situation is shown in the lower encircled schematic that has been added for clarity and indicates this increasing gap as identified by the arrow (C). A desirable configuration is therefore required whereby the stress at (D) is reduced to an acceptable level thus requiring that the gap at arrow (C) will not occur or will be considerably reduced and/or that any stress is distributed over a larger area and/or a durable support may be added to the screen member at (D) that will not be visible or deteriorate the screen image quality.

A solution to the aforesaid disadvantage can be that the frame member can be much thicker in the vertical plane of the example shown such that the hinge mechanism can be retained towards the outside of the said frame thus permitting a larger area of screen located behind the frame and permitting that additional support can be added. However this thicker screen has other disadvantages due to the additional volume and mass of frame to be collapsed and stored. A preferable embodiment is whereby the screen member is extended past the hinge mechanisms to be, attached towards the outside of the screen frame and thus distributing any screen member stresses or fatigue over the larger area now present and immediately adjacent to and behind the frame member and also enabling that additional support can be attached to this same area where it will not be visible to a viewer. However a requirement of this configuration is that the frame member, its elements and the hinging or folding methods or mechanisms should be essentially contained within the said members or elements with no protrusion when in the open condition that may disturb the visible planarity of the screen member.

Therefore jointing methods or mechanisms are preferred that have essentially no protrusions outside of the frame elements when the screen member in the open condition yet permits rotation of frame elements relative to each other by up to 180 degrees by creating a real axis that can move outside of the frame section or by a virtual axis of rotation out-with the frame member section and also whereby the increasing gap at the initial movement from the screen member open condition towards the closed condition—as shown previously in FIG. 3—will not occur or will be significantly reduced.

Figure 8:
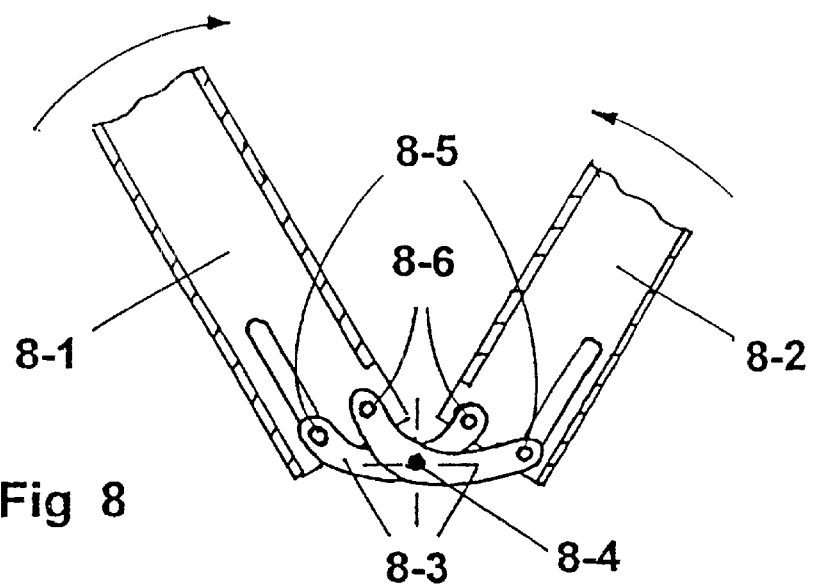
FIG. 8 is a cross-sectional view of a preferable embodiment of a jointing means that has a combined linear and rotational action that provides an action similar to a virtual axis of rotation outside of the physical frame elements.

FIG. 8 is a cross-sectional view of an example embodiment of a jointing configuration that combines linear and rotational means to provide an action similar to a virtual axis of rotation present outside of the physical frame elements. The example shown is of a mechanism combining a sliding and hinging action that is contained entirely within the screen frame without protrusion when the screen member is in the open condition and has a reduced gap that opens at the initial closing movements of the screen member. The screen frame elements (8-1) & (8-2) are shown to be partially rotated from an initial in-line position towards a final possible angle of 180 degrees to a position where (8-1) & (8-2) are adjacent and essentially parallel but not necessarily touching. This embodiment uses a hinge type of element (8-3) that is composed of 2 or more parts that have a common central axis (8-4) and where the parts are alternately connected at one end to either the fixed axis (8-6) of (8-1) and at its opposite end to the sliding and pivoting axis (8-5) of (8-2) or the alternate part is connected at one end to the fixed axis (8-6) of (8-2) and its opposite end to the sliding and pivoting axis (8-5) of (8-1). This example embodiment then permits that the hinge element (8-3) can pivot and partially slide its axis (8-4) outside of the frame elements thus permitting rotation of up to 180 degrees between frame elements (8-1) and (8-2) thus acting as if pivoting (8-1) and (8-2) around a virtual axis outside of the frame elements.

Figure 9:
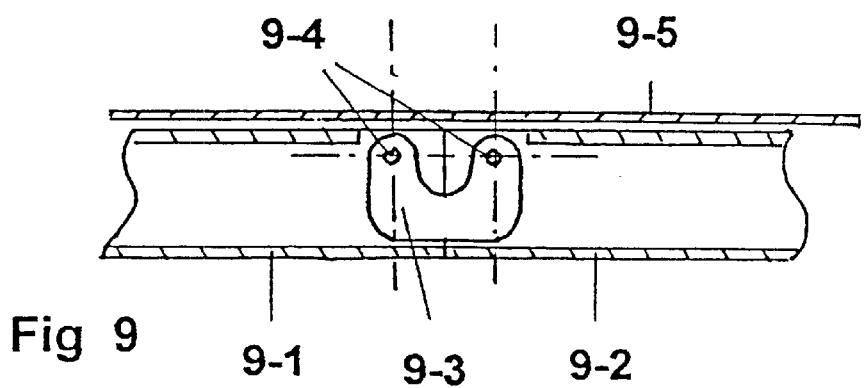
FIG. 9 is a cross-sectional drawing that shows another embodiment of a jointing means that achieves the same result as that shown in FIG. 8.

FIG. 9 is a cross-sectional drawing that shows another embodiment by way of example of a jointing method that achieves the same result as shown in FIG. 8, is mechanically simpler as sliding motion is not required and has no increasing gap as also described in FIG. 8. This example method operates by the use a single hinge element (9-3) with two parallel axis (9-4) raising perpendicular out of the plane of the drawing such that both elements (9-1) & (9-2) can each rotate independently through essentially 90 degrees relative to hinge element (9-4) thus acting as a single virtual axis of rotation that moves outside of the frame element cross-section. Element (9-5) is the screen member in cross-section.

Figure 10:
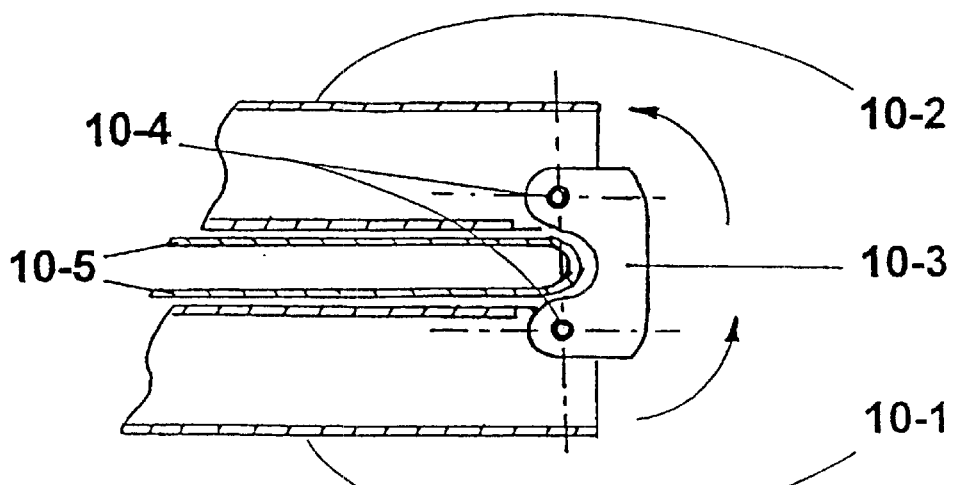
FIG. 10 is a cross-sectional drawing that illustrates the above embodiment of FIG. 9 with screen frame element rotated through 180 degrees.

FIG. 10 is a cross-sectional drawing that illustrates the above embodiment of FIG. 9 with screen frame element (10-2) rotated through 180 degrees relative to screen frame element (10-1) and also shows that the screen member material is constrained to move into a lightly rolled or folded position between elements (10-1), (10-2) & (10-3) and whereby the hollow of the hinge element (10-3) is sufficient to avoid pressure or friction against the screen material.

FIG. 4 and FIG. 10 when viewed together demonstrate how the material of the screen member (10-5) being held between the upper and lower horizontal frame elements is therefore constrained to fold in a similar manner along lines approximately adjacent to the principal axis of rotation shown as (A—A) & (B—B).

Figure 11:
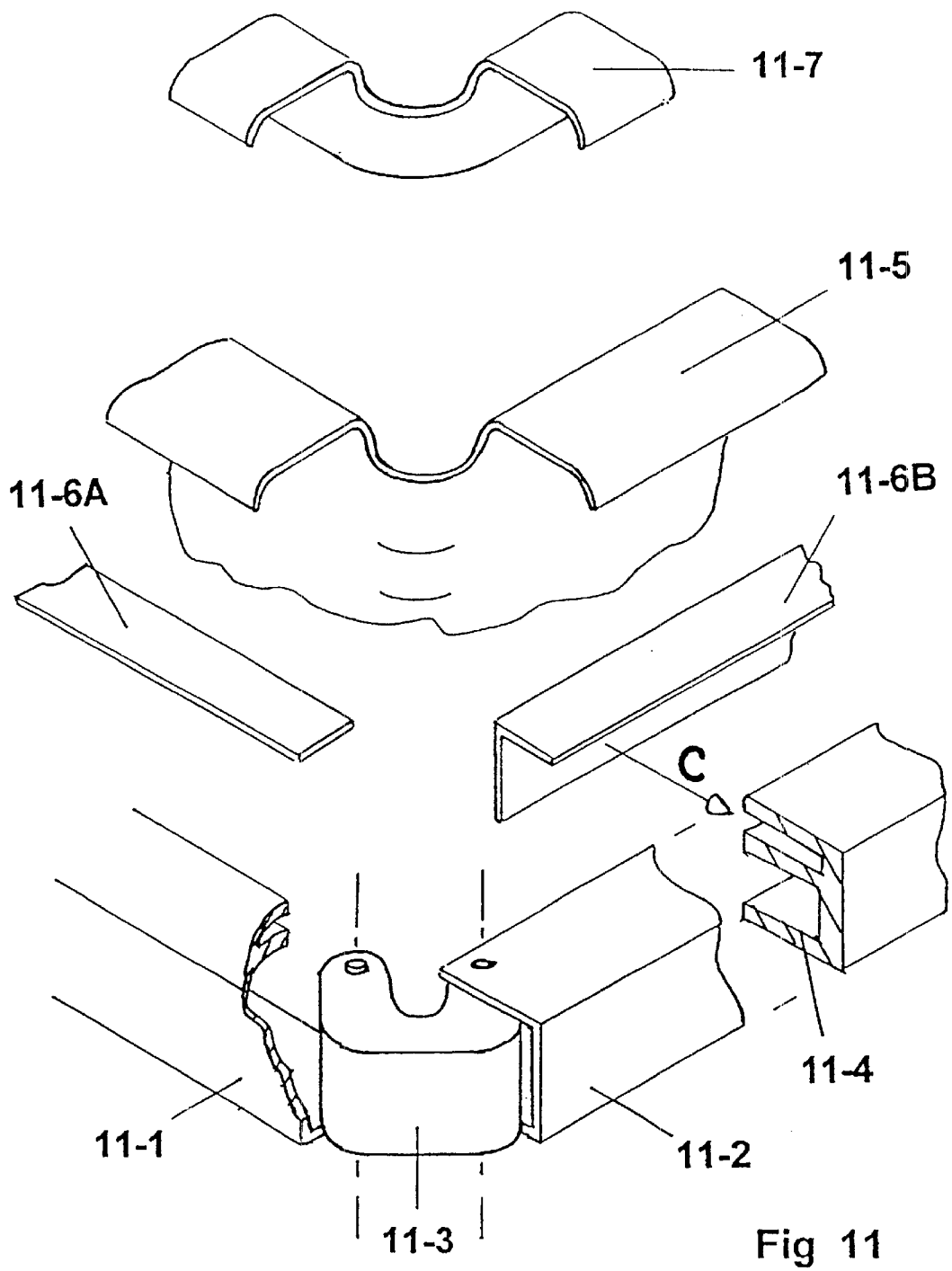
FIG. 11 is an exploded and partially cut-away perspective drawing that illustrates an embodiment of the detail of the jointing means as illustrated in FIGS. 9 & 10.

FIG. 11 is an exploded and partially cut-away perspective drawing that illustrates an embodiment of the detail of the jointing means as illustrated in FIGS. 9 & 10. The screen element (11-5) can be affixed, folded over or bonded to the screen attachment elements (11-6) that can be of a form similar to that shown by either (6A) or (6B). The combined elements of (11-5) and (11-6) can then be located into the screen frame slot as indicated by the arrow (C) of the drawing and if necessary locked in place by other means such as screws (not shown for clarity). Also shown is an optional additional supporting element (11-7) that is also flexible but may be of a stiffer and very durable nature and that may be integral with, or bonded to, the screen member to provide additional mechanical support to the screen element across the gap of the joint between frame elements (11-5).

Figure 12:
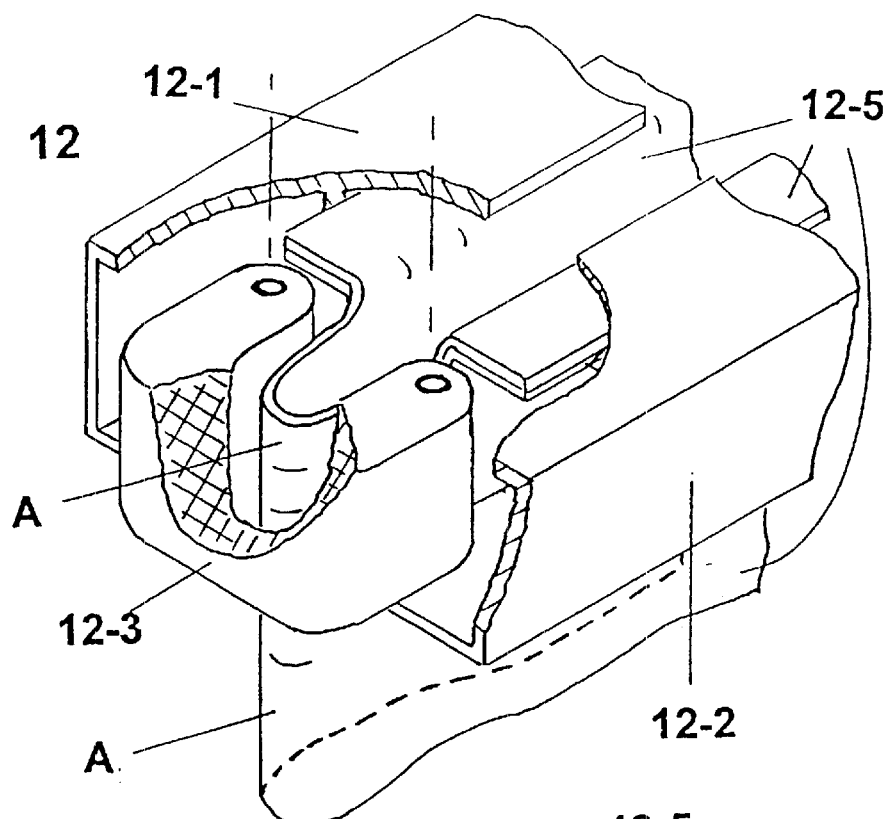
FIG. 12 is a detailed cut-away perspective view of the jointing means as described in FIGS. 9, 10 & 11.

FIG. 12 is a detailed cut-away perspective view of the assembled hinge assembly as described in FIGS. 10, 11 & 12.

Figure 13:
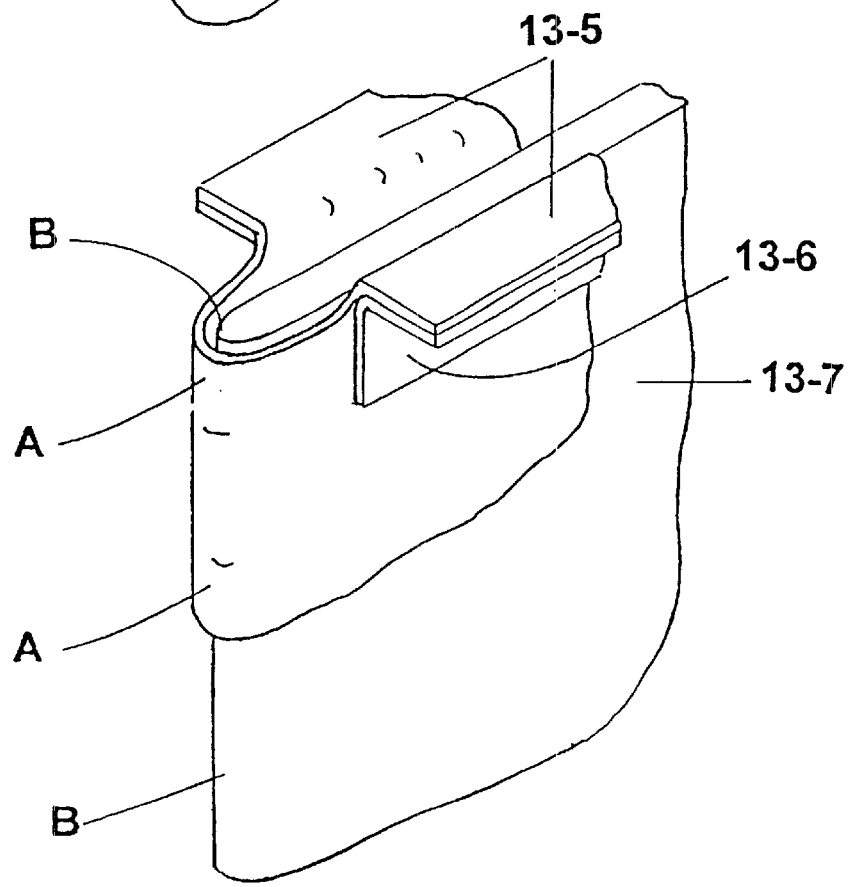
FIG. 13 is a perspective view similar to FIG. 12 and showing only the screen element, its attachment members and a further optional fold guide element.

FIG. 13 is a perspective view of the same assembly as FIG. 12 and shows for clarity only the screen element (13-5) and a further optional fold guide element (13-7). The intention of this optional fold guide element is that as the screen member moves to the closed condition, the fold guide element will provide additional support to the material of the screen member along the fold line (A—A). As the said screen member closes, the screen material therefore wraps-around the contoured edge (B—B) of the fold guide element and is thus retained in the appropriate shape and contour of the support.

The above example embodiments of the jointing methods, have all used sliding or hinging actions or a combination thereof by way of example. The following is a different approach using folding methods.

Figure 14:
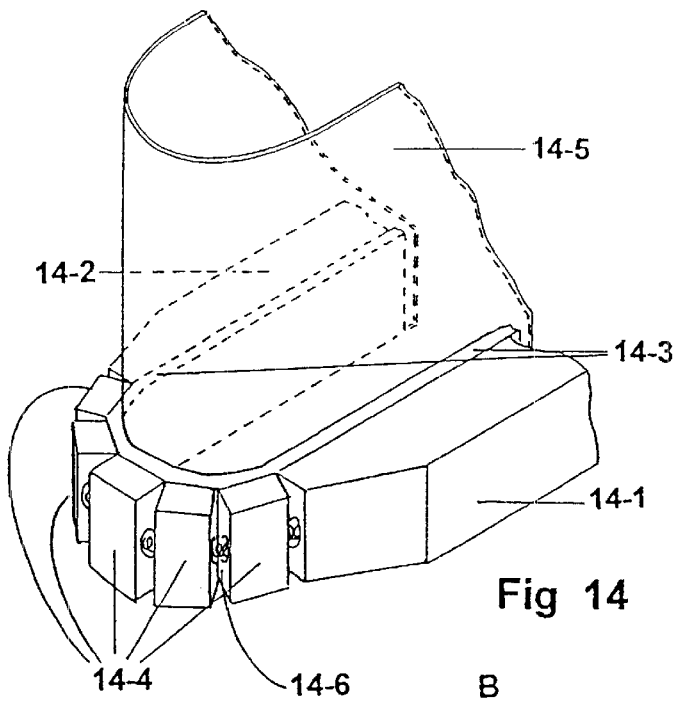
FIG. 14 is a cut-away perspective view of another embodiment of a jointing means using only folding methods.

FIG. 14 is a cut-away perspective view of an example embodiment of jointing methods using only folding methods. In this example the frame member consists of an essentially in-extensible but flexible supporting band (14-3), the frame elements (14-1) & (14-2) and the optional multiple segments, of (14-4). These elements can be either bonded together or made as a single integral flexible part. The elements together effectively operate as a continuous hinge across the location between the rigid sections of frame elements (14-1) & (14-2) and where may be located the segments (14-4). The screen member (14-5) is attached or bonded to the band (14-3). Where segments (14-4) are used then a tension spring member (14-6) may pass through the segments (14-1), (14-4) and (14-2) such as to retain the frame elements in the open position and ensure that the curvature between each of the elements is uniform when in the closed position.

The following FIGS. 15 through 21 demonstrate by way of example, embodiments of the screen assembly and their use as part of a visual display device using jointing means as shown in the preceding figures.

Figure 15:
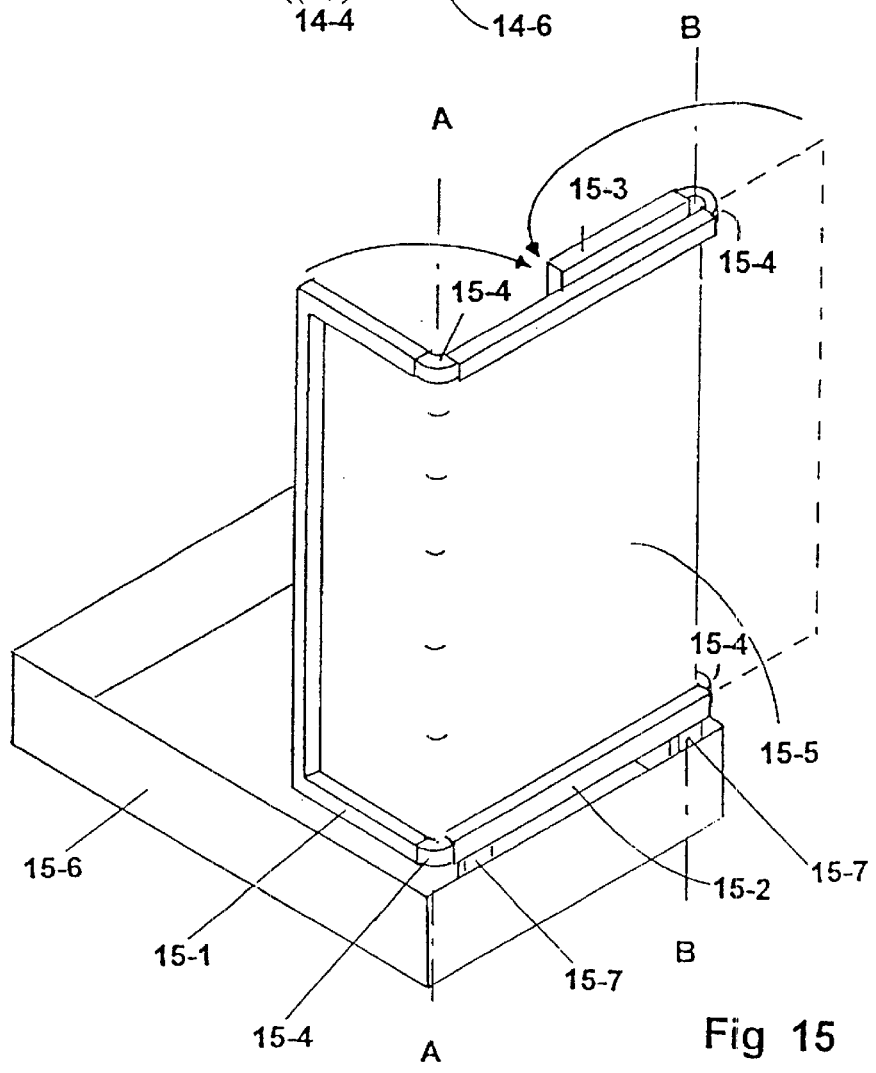
FIG. 15 is a perspective view showing in more detail an embodiment similar to the upper embodiment of FIG. 4.

FIG. 15 is a perspective view showing in more detail an embodiment similar to the upper embodiment of FIG. 4 in the open condition and wherein four jointing means (15-4) are included to permit a collapsing action around axis (A—A) and (B—B) of the outer frame sections (15-1) & (15-3) and the central section (15-2). A base member (15-6) that acts as a support to retain the screen assembly in the upstanding position is also shown. This base member is also configured as an enclosure. Two possible different closed conditions of the screen sections are shown. In the first, one of the screen assembly outer sections is rotated to 90 degrees as in (15-1) such that when the entire screen assembly is further collapsed towards the enclosure base member about jointing means (15-7) between the base and screen assembly, then the outer screen section falls parallel and adjacent to the sides of the enclosure. Depending on configuration, the outer screen section may be inside or outside of the enclosure. The second possible closed condition is whereby the outer screen sections—as shown by (15-3) that is rotated through 180 degrees such as to be adjacent to the central screen section (15-5).

It can be noted that in all of the simple embodiments shown in FIGS. 2 through 4, the screen assembly is likely to require other support to prevent the frame member trying to collapse itself back into the closed condition. A mechanical support is required for the frame elements or hinges to properly maintain the screen assembly in the open condition. This can be of many forms such as locking mechanisms or the addition of simple spring action within the frame elements to maintain the screen assembly planar and open for viewing. Mechanical support may also be provided by attached panels as is shown in the following embodiment using frame supporting panels.

FIG. 16 is a perspective view of the same device as FIG. 15 in which frame support panel members (16-8, 16-9, 16-10, 16-11, 16-12, 16-13, 16-17) are provided and are attached by jointing means along their front edge to the side upstanding frame element of the outer screen section (16-1) and the upper horizontal frame elements of the screen central section (16-2). The frame support panels may be of a rigid or semi-rigid nature and composed of several sections attached by jointing means along joint lines (as indicated by long dashed lines when not folded and solid lines when folding or folded). The figure also shows that the screen assembly may be mounted on jointing means (16-7) to sliding elements (16-14) and that the lower edge of the screen supporting panels are attached by jointing means to side arms (16-15) that rotate out from the sides of the base about their attachment points (16-16). As is shown by FIG. 16, when the screen assembly is fully advanced on the slide elements (16-14) away from enclosure, then the side supporting panels (16-8) & (16-17) are constrained to move outwards by reason of the support panels being attached to the side arms (16-15) that are in turn constrained to pivot outwards. This action pulls the side frame support panels fully open and will constrain the upper frame supporting panels (16-9, 16-10, 16-11, 16-12, 16-13) to move to a common planar position that will effectively support and retain the screen assembly sections in their fully open position and prevent the screen assembly sections from collapsing to the closed condition. It can be noted that the side panels may be used to provide support via the side arms (15) to retain the screen assembly in an upstanding position.

FIG. 17 is a perspective view of the same device as in FIG. 16 whereby the screen assembly is retracted back to be adjacent to the front edge of the base member (17-6). Viewing FIGS. 16 & 17 together, the frame supporting panel elements (17-8, 17-10, 17-11, 17-12) have been collapsed against the screen assembly. The side arms (17-15) are retracted into the base member and their attachment point (17-18) to the side frame supporting elements (17-8) & (17-17) fall adjacent to the axis of the jointing means between the base member and the screen assembly. The joint lines between the upper frame supporting elements (17-10 to 17-11) and (17-11 to 17-12) as shown in FIG. 17 are immediately adjacent to the axis (A—A) and (B—B) thus permitting that the screen assembly and frame supporting panels may now be collapsed through 180 degrees along the axis (A—A) and (B—B) to the closed condition. The collapsed screen assembly can now be further collapsed around the axis of the jointing means at (17-7) to move from its upstanding position to be enclosed within the base member.

FIGS. 18 through 21 shows an embodiment of the invention utilising images generated by rear projection methods and where the screen frame contains two parallel axis for the collapsing of the sections of the screen assembly. The principles of the light shield member (as may be required in rear projection) and the base/enclosure member are also introduced and a further use of the side arms is demonstrated.

Figure 18:
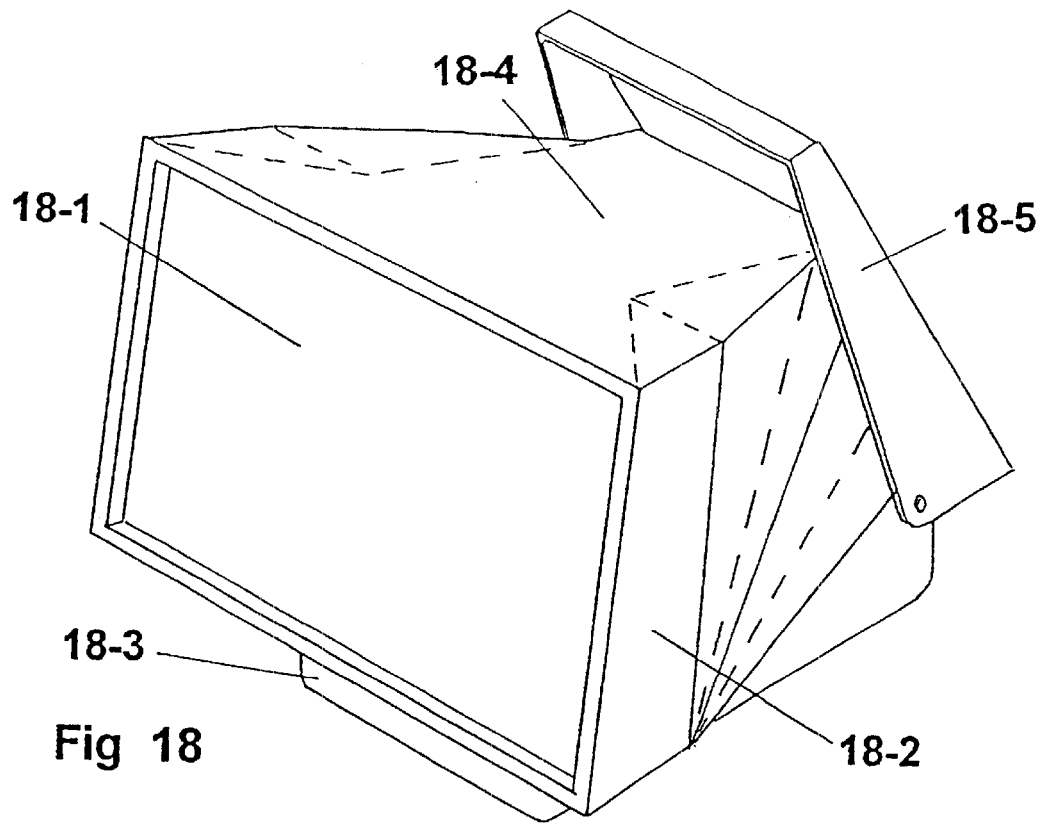
FIG. 18 is a perspective view of an embodiment of a visual display device similar to FIG. 17 but using a screen assembly with two parallel axis of collapsing and with a screen member of a material suitable for rear projection.

FIG. 18 is a perspective view of an embodiment of a visual display device similar to FIG. 16 but using a screen assembly (18-1) with two parallel axis about which the assembly collapses and with a screen member (18-1) of a material suitable for rear projection. A base member configured as an enclosure member (18-3) with lid (18-5) and a light shield member are also shown. The purpose of the light shield member is to eliminate or reduce the ambient light that may impinge on the rear side of the screen member when a suitable screen is employed for rear projection methods. The light shield may consist of an upper element (18-4), two side elements—only one side shown (18-2) and a rear element that in this case is represented by the enclosure lid (18-5). The light shield may be constructed to be of any suitable form or material that is fit for this light shielding purpose and is preferably of a collapsible nature by jointing means between the light shield sections. In the FIG. 18 the fold lines are shown as dashed lines when unfolded and as solid lines when folded.

It can be noted that the side elements of the light shield may be attached by jointing means along their lower side edges to the side arms that were shown in the previous example embodiment. The front edges of the top and side light shield elements are attached to the screen assembly by jointing means and the front sections of the light shield operate identically to the frame supporting panels of FIGS. 16 and 17 and thus effectively replace these frame supporting panels in their use to support the upstanding screen assembly and also retain the screen assembly sections in their open position. It is a further preferable feature that the light shield member is also collapsible and further, it is preferable that the collapsing action of the light shield is of an integral manner therefore not requiring any addition or connection, removal, disconnection or re-location of any parts thereof. It is a further preferable feature that if the light shield is initially collapsed against the screen member such that the light shield may then collapse in an integral manner with the screen assembly towards and into the base member—and thus reducing the actions required to collapse the combined assembly. The following figures further demonstrate such embodiments.

Figure 19:
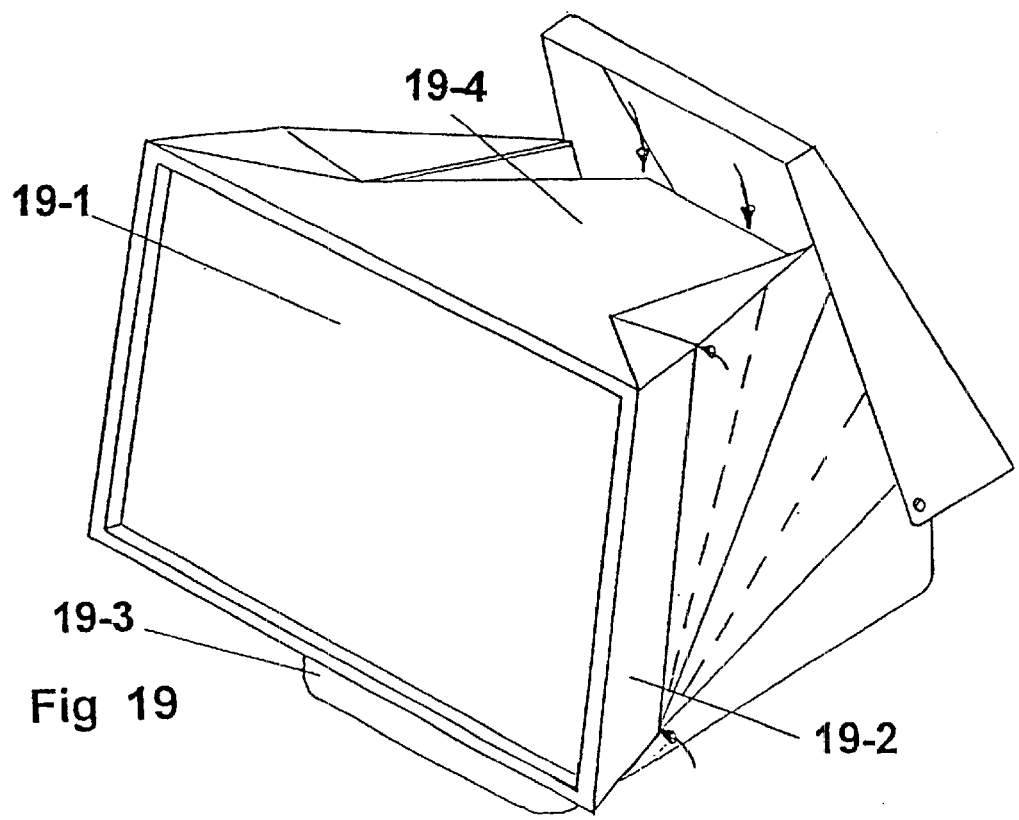
FIG. 19 is a perspective view of the same device as in FIG. 18 whereby the screen assembly is shown folding downwards towards the screen assembly.

FIG. 19 is a perspective view of the same device as in FIG. 18 whereby the top light shield element is hingeably attached to the top edge of the screen assembly along its front edge and is shown folding downwards towards the screen assembly. As it does so, the folding action also causes the front section of the side light shield element (19-2) to fold inwards about its attachment edge with the side of the screen frame member in a similar manner to that shown in FIGS. 16 and 17. This action will also permit that the screen assembly will retract rearwards towards the front top edge of the enclosure member (19-3) and the sides of the light shield member (19-2) will be moved inwards as the side arms, similarly to that of FIGS. 16 and 17, will retract into the sides of the enclosure (19-3).

Figure 20:
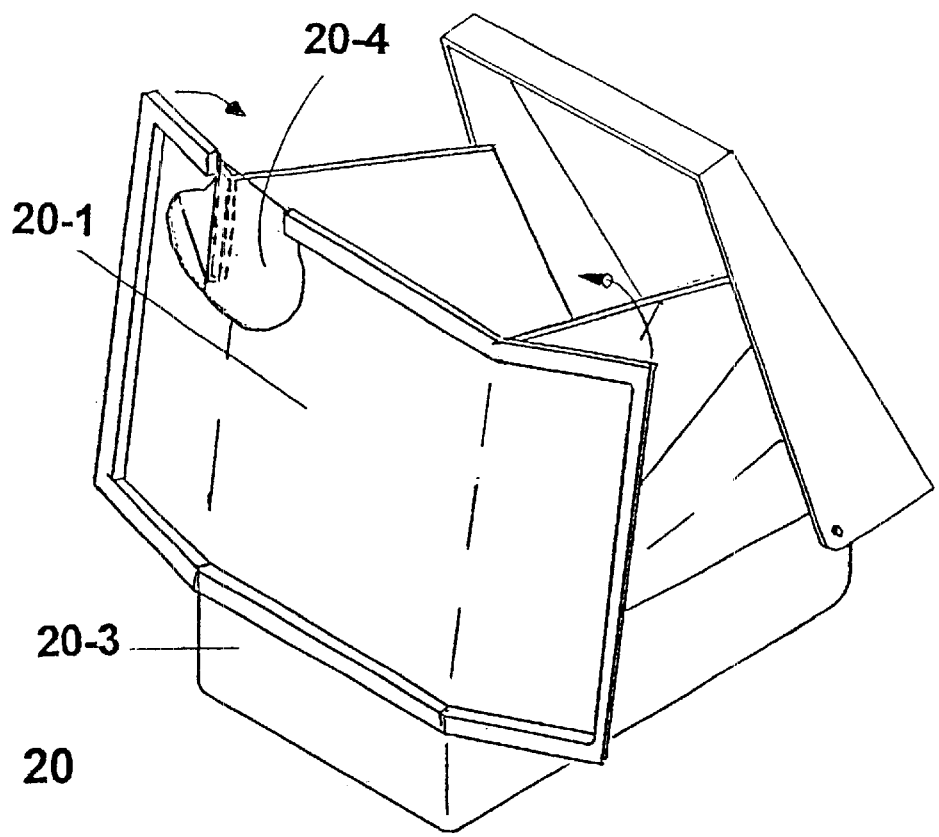
FIG. 20 is a perspective view of the same device as in FIG. 19 whereby the top light shield member has folded downwards against the screen assembly.

FIG. 20 is a perspective view of the same device as in FIG. 19 whereby the top light shield member (20-4) has folded downwards against the screen assembly and in doing so has folded completely the front section of the side light shields (20-2—not shown) behind and against the screen assembly into a position similar to that of FIG. 17. It may be noted again that as in the device explained in FIG. 17, the fold lines of the upper element of the top light shield element should be immediately adjacent to the parallel fold lines of the screen assembly as prescribed by the screen frame axis and thus permitting the combined light shield and screen assembly to fold together in the direction of the arrows indicated to a closed position at 90 degrees to the original open position.

Figure 21:
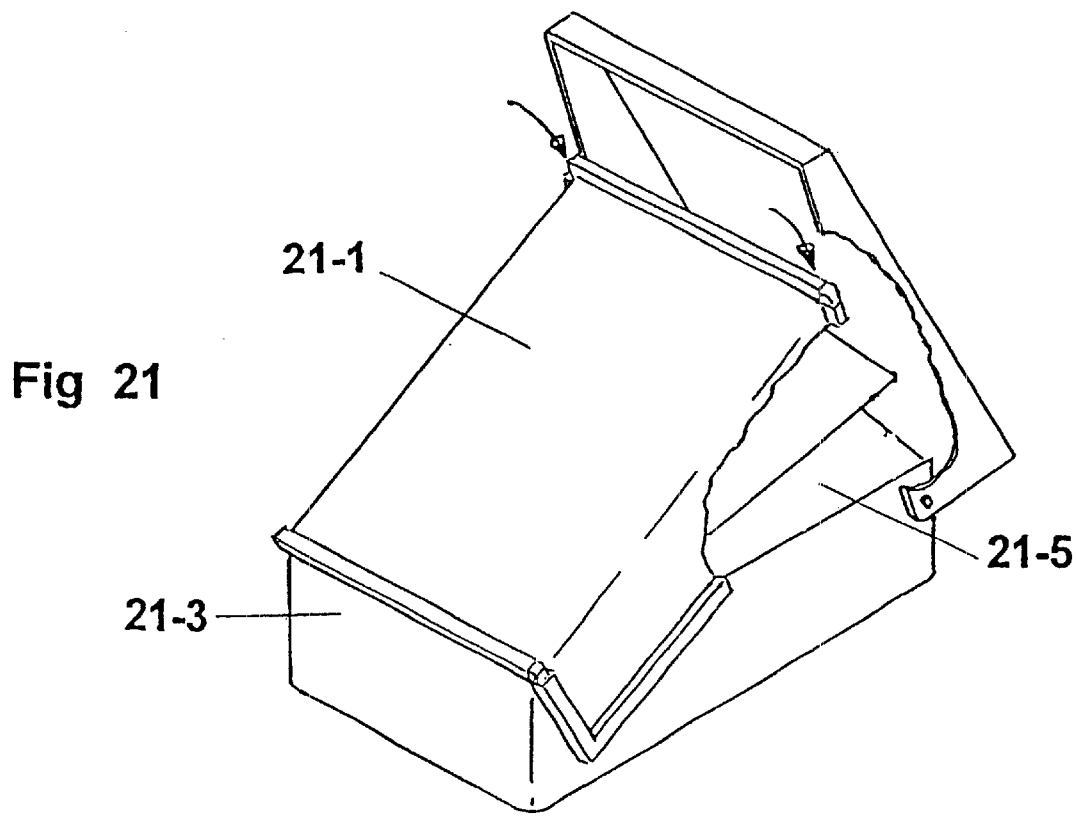
FIG. 21 is a perspective view of the same device as in FIG. 20 whereby the screen assembly sections and light shield sections have rotated about the two parallel axis to approximately 90 degrees.

FIG. 21 is a perspective view of the same device as in FIG. 20 whereby the screen assembly sections and light shield sections have rotated about the two parallel axes to approximately 90 degrees. The combined light shield and screen assembly can now be collapsed again into its final position adjacent to the enclosure by hinging rearwards about the joints connecting it (via the slide elements similar to FIG. 16) to the base member (21-3). When collapsed completely, the outer sections of the screen assembly will be adjacent to the outer surface of the sides of the enclosure (21-3) and the central section of the screen assembly (21-1) is adjacent and approximately flat and parallel with the top of the enclosure (21-3). The means of collapsing of the remaining side sections of the side light shield elements (21-5) can be of many forms and an example of this can be by a simple concertina folding action defined by fold lines forming triangular elements with a common apex co-incident with the axis of rotation of the screen assembly. The lid of the enclosure can be configured so as to partially or completely enclose the screen assembly when the lid is itself closed.

It is desirable in any screen member embodiment that it will permit the screen assembly to collapse or deploy in an integral and self-supporting manner. FIGS. 15 through 21 show that the screen assembly (and any attachments thereto i.e. the light shield) can move as a complete assembly between the open condition and the closed condition and do so by a single action or short series of actions that relate only and directly to the opening or closing actions and without need for any disconnection or detachment or removal or re-location or addition or connection or re-connection of any element or member. Means such as springing action may be included further assisting the individual assemblies or frame supporting panel elements to be self-supporting.

With particular reference to the embodiments described in FIGS. 15 through 21, it can be further noted that opening or closing actions of the screen assembly of the invention can be executed by user intervention or by inherent mechanisms (such as springs) or by an external drive (for example by means of motorization) that may also be attached to the base member or enclosure to further maintain or control the position of the frame supporting elements or be used for motorising the action of opening or closing the screen assembly and/or light shield assembly.

The next series of figures demonstrate the use of non-parallel axis of folding of the screen assembly and example embodiments.

Figure 22:
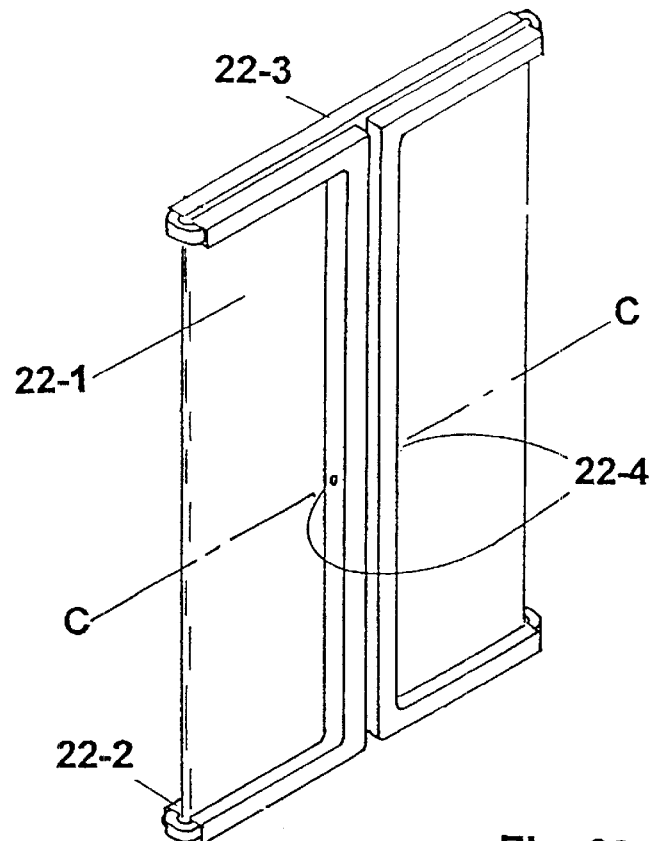
FIG. 22 is a perspective view of a collapsed screen assembly similar to that presented in previous figures and using two parallel axis of collapsing with a further set of hinge elements that define a third axis perpendicular to the two existing parallel axis.

FIG. 22 is a perspective view of a collapsed screen assembly similar to that presented in previous figures and using two parallel axis of collapsing. Also indicated are a further set of hinge elements (22-4) that define a third axis (C—C) perpendicular to the two existing parallel axis.

Figure 23:
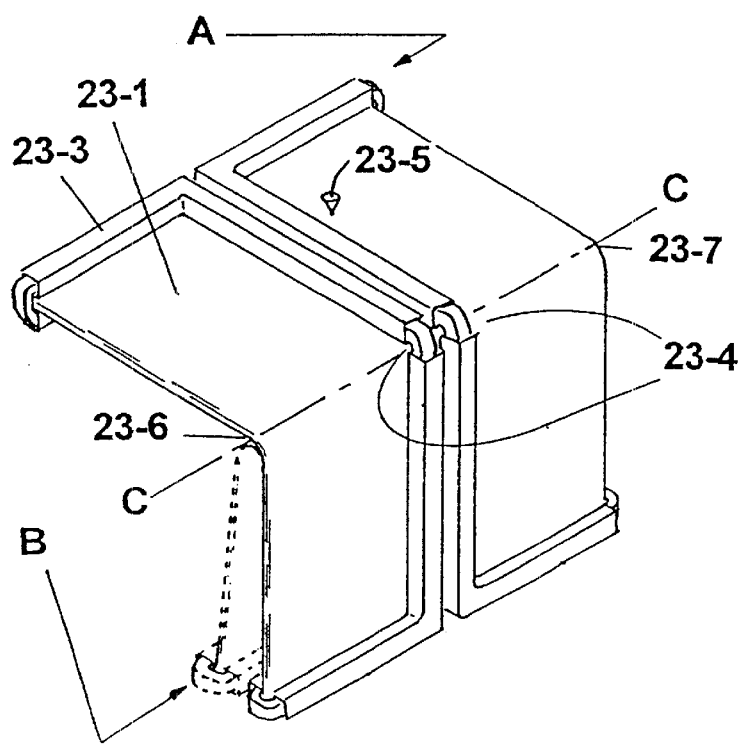
FIG. 23 is a perspective view similar to that of FIG. 16 that illustrates a further embodiment of the invention whereby the top section of the screen assembly can hinge down as a secondary collapsing action.

FIG. 23 is a perspective view very similar to that of FIG. 22 that illustrates a further embodiment whereby the top section of the screen assembly (23-3) can hinge down as a secondary collapsing action and whereby the further folding action occurs about a further axis (C) that is at 90 degrees to the original two parallel axis of collapsing. This secondary collapsing action can be performed by use of jointing means at (23-4) that may have features similar to those illustrated in FIGS. 7 through 13. The arrow (23-5) represents the movement downwards from the original position at a 90 degree position (A) and this movement may be continued down to a final position—shown by the dotted lines (B). The screen fold edges have potential pinching or crushing points that may occur on the fold lines (23-6) and (23-7) of the screen member (23-6) due to this secondary rotation towards the final closed condition.

In reference to FIG. 23, it is evident that additional support to the screen member is required in the case of the above described secondary collapsing condition to avoid pinching or crushing actions and this support can be similar to or based on the principals outlined within the description of FIG. 13 with an additional means to be described in the following figure.

Figure 24:
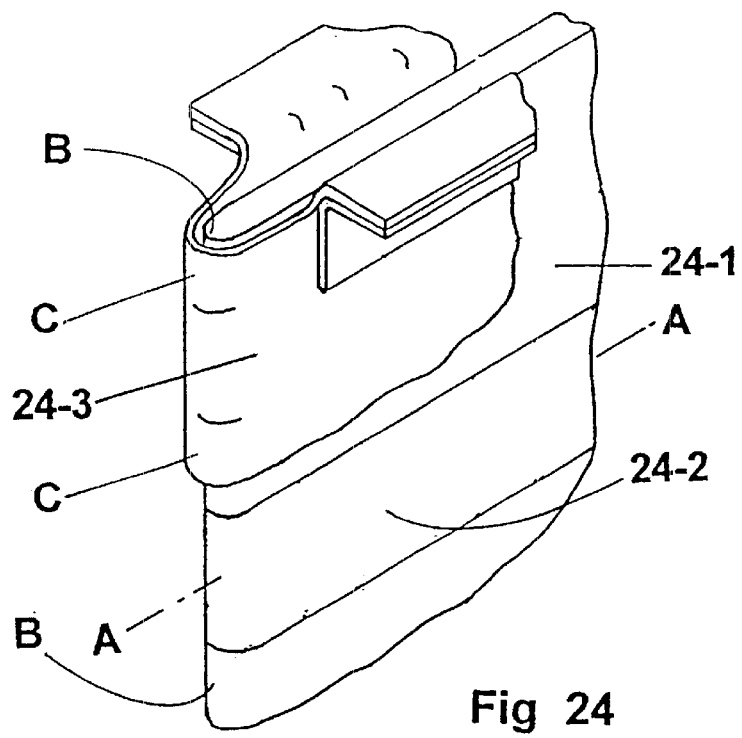
FIG. 24 is a perspective cut-away view similar to that of FIG. 13 that illustrates a further embodiment of the proposed fold guide elements.

FIG. 24 is a perspective cut-away view of an arrangement similar to that of FIG. 13. This illustrates a particular further embodiment of the proposed fold guide elements (24-1) whereby it can be composed with a different material, thickness or physical configuration such that a flexible section (24-2) of the fold guide elements may easily bend around a virtual axis (A—A). This axis and thus the flexible section (24-2) should be located as part of the fold guide elements (24-1) such that this position coincides with the line of folding of the screen member material (24-3) such as to be adjacent to the axis (C—C) of FIGS. 22 and 23 and thus situated between the points (24-6) to point (24-7) of FIG. 23.

Figure 25:
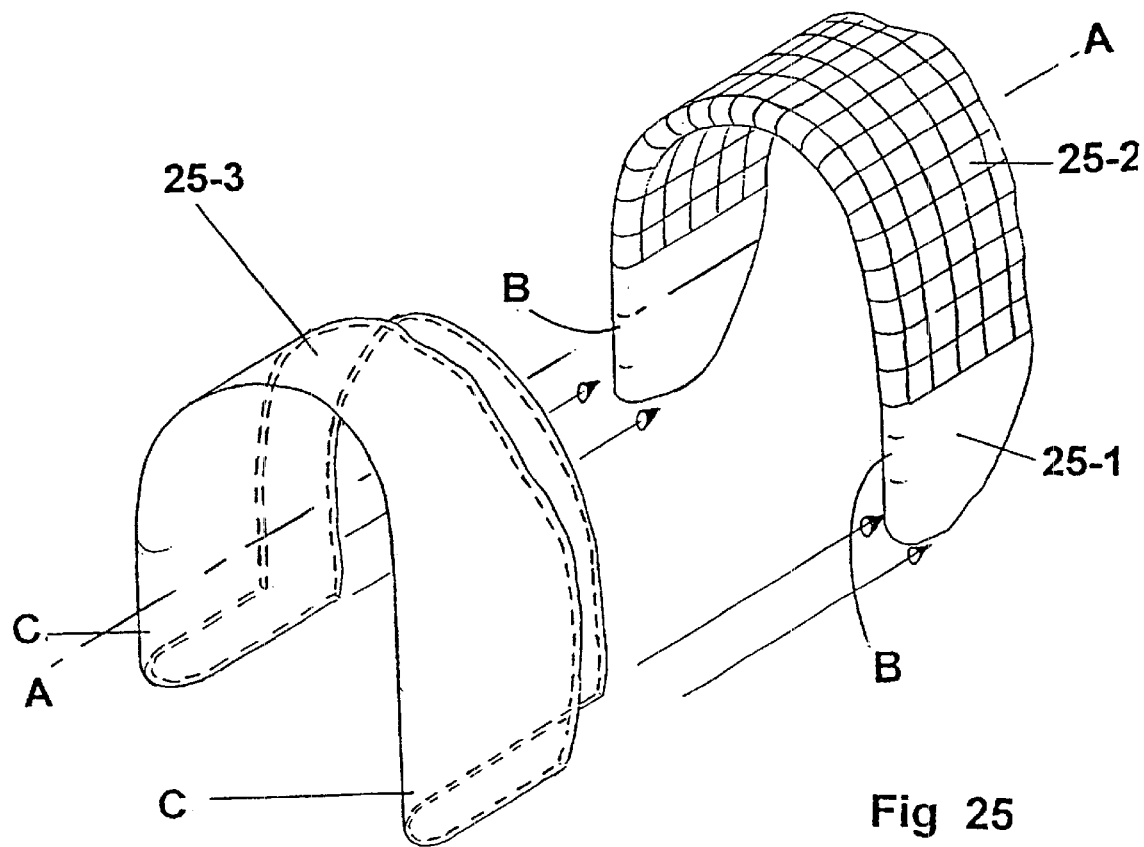
FIG. 25 is a cut-away and exploded perspective view of part of the screen member and the fold guide elements at the critical positions.

FIG. 25 is a cut-away and exploded perspective view of part of the screen material (25-3) and the screen material support (25-1) at the critical positions shown as Points (25-6) & (25-7) of FIG. 23 due to the action. of the secondary collapsing action as described in FIG. 23. The screen material (25-3) and screen material support member (25-1) are in reality in contact but are shown to be separated in this figure for reasons of clarity. A grid has been drawn for clarity on the surface of the flexible section (25-2) such that the resulting shape of the fold guide elements is understood and the form that the screen material will adopt along the fold line (C—C) at the contact with the contoured edge of the screen material support member (B—B).

The jointing means (23-4) of FIG. 23 can be of a similar nature to those described in FIGS. 9 through 13 but large enough to accommodate the outer diameter of curvature of the screen and screen material support members when in the closed condition as shown in FIG. 25.

Referring to the screen material (25-3) shown in FIG. 25, the inner and outer radii of curvature, the flexibility of the screen element and its tension within the collapsed frame should be such that the additional tension of being stretched over the outer surface of the folded section (25-2) will not cause optical or mechanical damage to the screen element and also that the reduction in tension on the inside surface of the folded section (25-2) will not permit undue wrinkling or pinching of the screen material.

FIGS. 26 through 30 provide an example embodiment of a screen assembly having two parallel axis and a third perpendicular axis of collapsing and its use within a visual display device being activated by rear projection methods.

Figure 26:
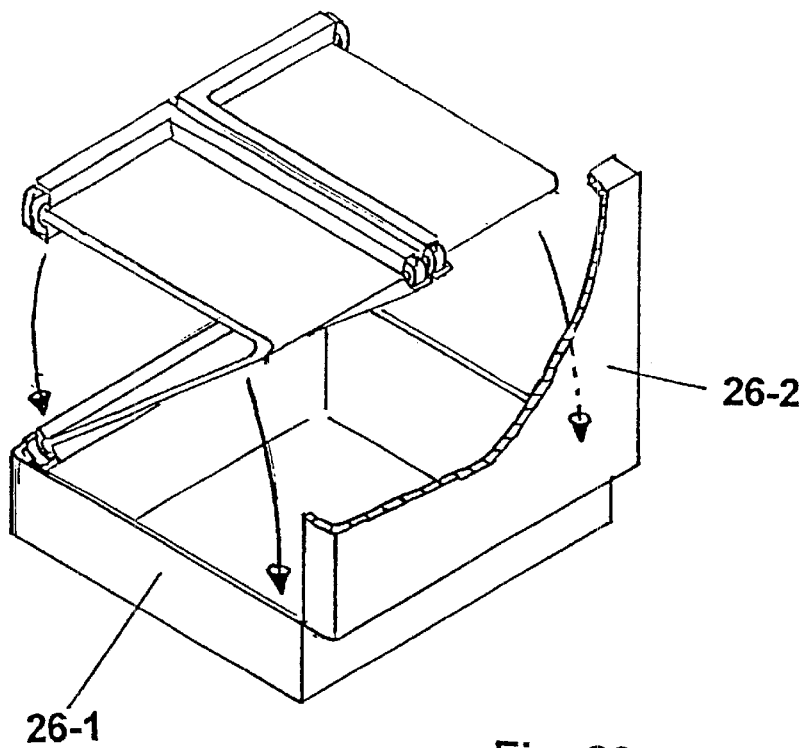
FIG. 26 is a perspective view of the screen assembly being attached by jointing means at its lower edge to a base member.

FIG. 26 is a perspective view of a screen assembly similar to that shown in FIG. 22 being attached by jointing means on its lower side to a base (26-1) that can be positioned on a flat surface and is used to maintain the screen assembly upstanding when in the open position. This view shows the base may also be in the form of an enclosure with a lid (26-2) (shown in partial out-away).

Figure 27:
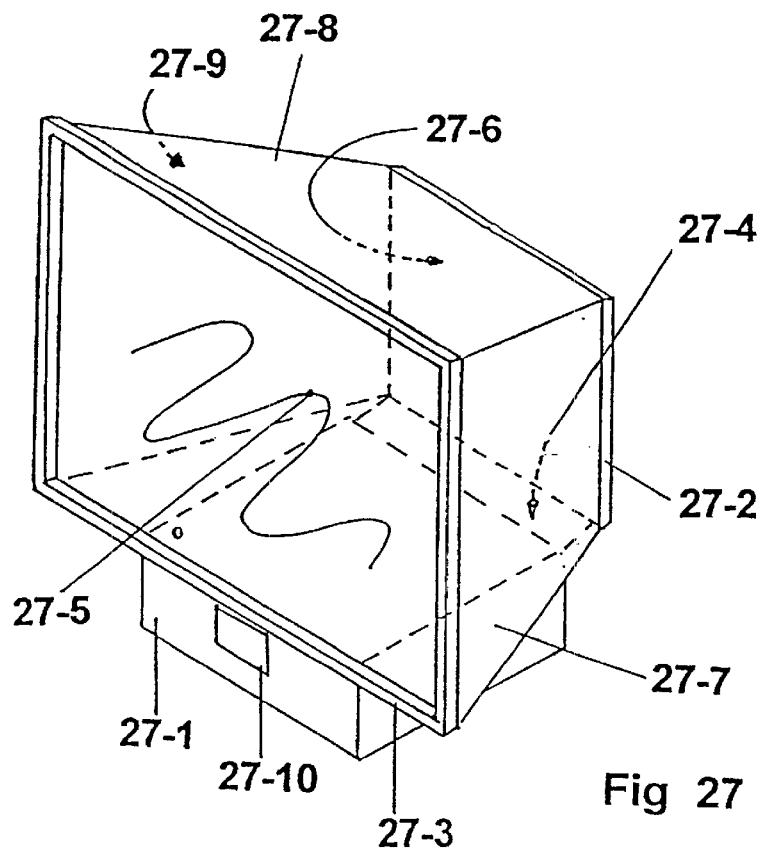
FIG. 27 is a perspective view showing a frontal view of the screen member in the open condition. A light shield member is also shown.

FIG. 27 is a perspective view of the same device as FIG. 26 showing a frontal view of the screen member (27-5) in the open condition. A light shield member is shown to be attached or adjacent to the frame member (27-3) and extends rearwards and downwards to be attached or adjacent to the base member (27-1) by means of its sides (27-7) & (27-9) and top (27-8). As explained previously in FIGS. 18 and 19, the front sections of the top and side light shield elements due to their being in a common plane and at an angle to the frame hinging axis effectively act as frame supporting panels and also assist in retaining the frame and screen assembly sections in their open position. If the base (27-1) is configured as an enclosure, it can be seen that where a lid of the enclosure is present and supported by the addition of hinging mechanisms to the rear of the enclosure (27-4), then the said lid may be used to act as the rear section of the light shield member and/or as a support thereto.

In further reference to FIG. 27 it can be noted that in the situation where the base member (27-1) is configured as an enclosure then this enclosure may also retain the projection device for rear projection either integrally within the enclosure or as a removable unit or as an attachment to the said base or enclosure member. The inner surface of the rear light shield or lid member (27-2) may support or have affixed to its inner surface a mirror member (27-6) to reflect images from the projector unit to the screen member. In the case of the projector being integrally mounted within the enclosure member, then an aperture (27-10) can be mounted in the enclosure such that a mirror affixed to the aperture will direct the light path of the projector to the screen member, possibly via another mirror, when the aperture is closed and when open will permit that the light path of the projector be allowed to exit the enclosure for front projection on a remote surface.

Figure 28:
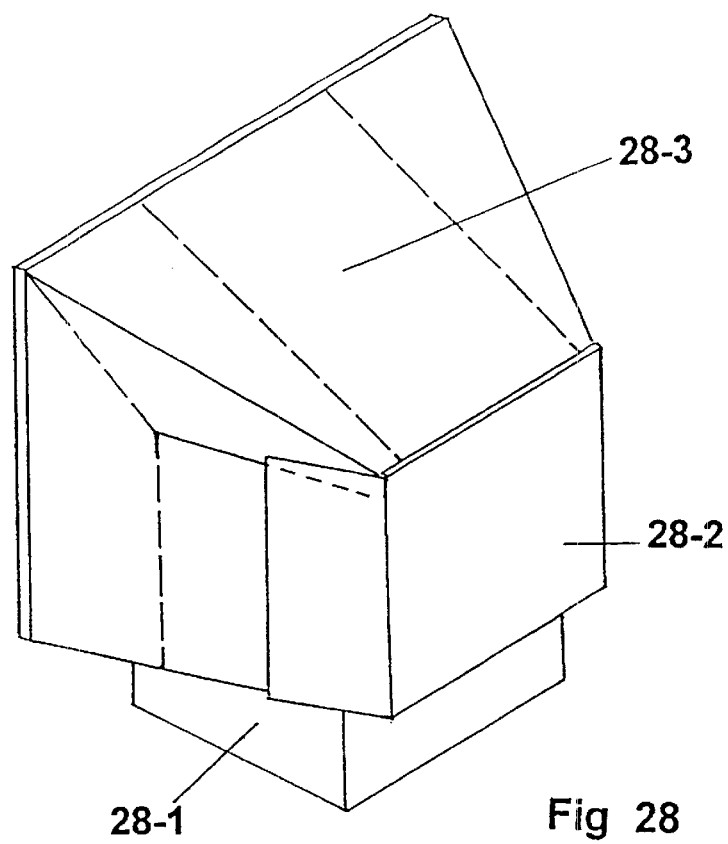
FIG. 28 is a view similar to that of FIG. 27 but from a rear perspective.

FIG. 28 is a view of the same device as in FIG. 27 but from a rear perspective and shows enclosure (28-1) and that the lid of the enclosure (28-2) that also act as part of the light shield member (28-3). This embodiment will, in the following figures, demonstrated further example of an integrally collapsing light shield member (however different in configuration from the previously shown embodiment of FIG. 16) whereby the folding or hinging action occurs along the folding lines indicated in the drawing by long dash lines (until folded it is thereafter represented by a solid line). The following figures describe the operation of this collapsing light shield member and how it also collapses integrally with the screen assembly.

Figure 29:
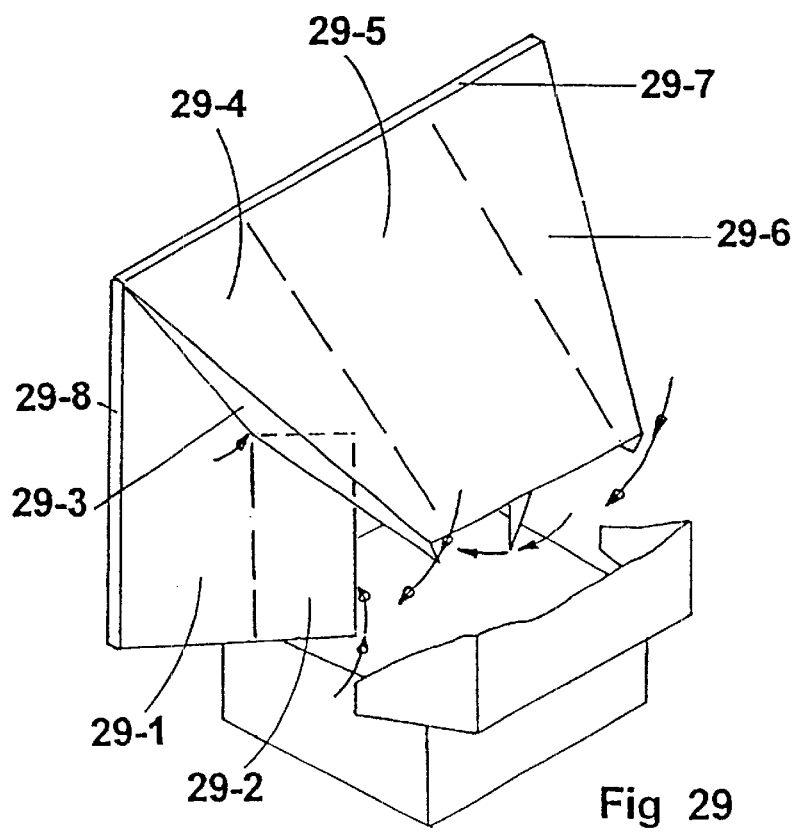
FIG. 29 is a view similar to FIG. 28 but with the light shield member moving to the collapsed condition.

FIG. 29 is a view of the same device as in FIG. 28 but with the enclosure lid (29-2) partially cut-away for clarity and showing the light shield member elements (29-1 through 6, elements on the remote side of drawing are symmetrical positioned but not identified for clarity). The upper light shield elements (29-4), (29-5) & (29-6) are attached to the corresponding elements of the upper frame elements (29-7). The front edges of light shield element (1) are attached to the upstanding side frame element (29-8). The side faces of the light shield member (29-1) & (29-2) when drawn towards the screen member as shown by the arrows, will cause the upper side light shield element (29-3) to fold inwards around the upper edge that is attached to the outer edge of upper element (29-4). This action also causes the light shield elements (29-4), (29-5) & (29-6) to rotate around their common axis of attachment with the top of the screen member (29-7) and thus rotate in a downward direction and thus also towards the rear face of the said screen member.

Figure 30:
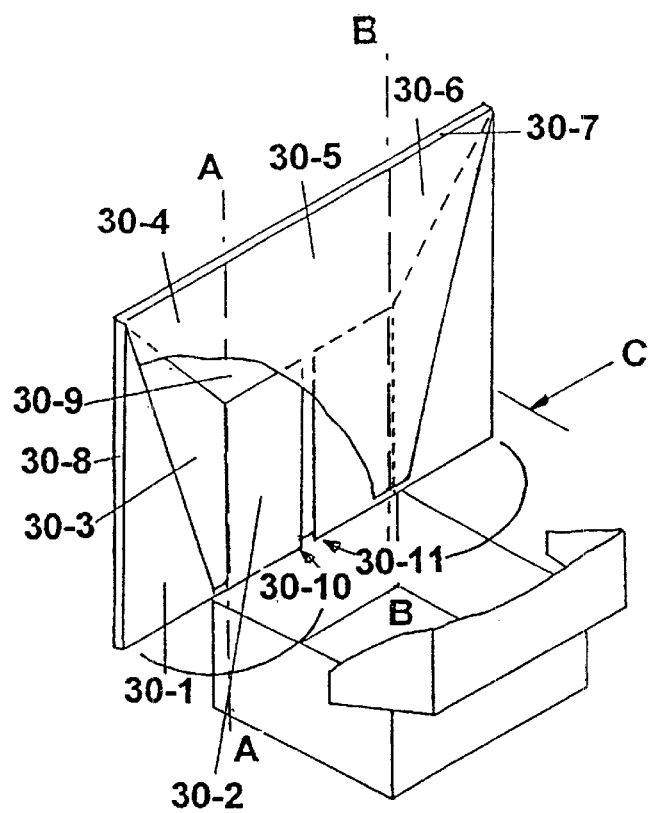
FIG. 30 is a view similar to FIG. 29 and with the light shield member fully folded against the rear face of the screen assembly.

FIG. 30 is a view of the same device as in FIG. 29 and with the aforesaid light shield member fully collapsed against the rear face of the screen assembly. It should be noted that the fold lines between the light shield elements (30-1 to 30-2) and (30-4 to 30-5) and also the previous lower edge of element (30-3) are all parallel and immediately adjacent to the axis of folding of the screen assembly. This permits that the outer screen assembly sections may still collapse as a combined screen assembly and light shield member to a closed condition by collapsing through 180 degrees about the axis (A—A) and (B—B) in the direction of the arrows (30-10) & (30-11) to the collapsed configuration similarly to that as described in previous figures.

A preferable embodiment of the light shield member would permit that the elements of the light shield when collapsed flat with the screen assembly as shown in FIG. 30 would together form a composite curved surface around which the screen element will roll into a fold along the axis (A—A) and thus act identically to the fold guide elements previously described as element (24-1) of FIGS. 24 and 25. The following figure further demonstrates how the light shield members by use of folding or flexible areas of their elements can be folded within the collapsing screen assembly and act as fold guide elements.

Figure 31:
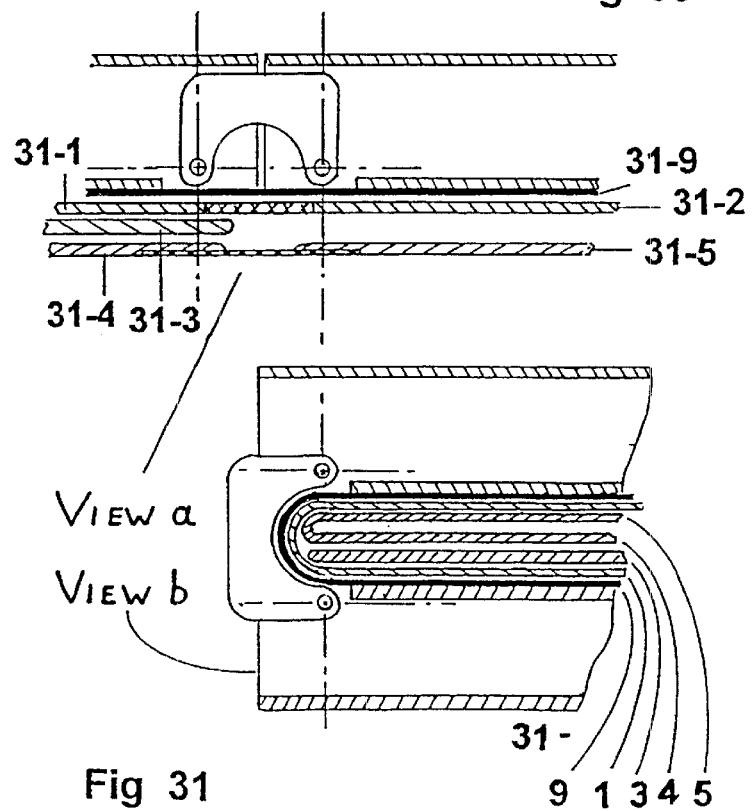
FIG. 31 is a horizontal cross-sectional view through the lower frame member.

FIG. 31 is a horizontal cross-sectional view through the lower frame member according to the direction of arrow (C) of FIG. 30. This cross-section is on a horizontal plane and shows schematically the most complex part of the combined collapsed assembly. The figure contains an upper and a lower view of the open and closed conditions respectively. The cross-section of the screen member is shown in black to differentiate it from the cross-sections of the various other light shield members in close proximity. For clarity, the areas of the light shield that are rigid or semi-rigid are shown in single hatching and the areas that are flexible such as the fold area at connection of (31-1 to 31-2) and the fold area at the connection of (31-4 to 31-5) are shown by cross-hatching.

Continuing with the closing action of the assembly as described in FIGS. 30 and 31, the screen assembly can now be considered to be collapsed along with the light shield member to its closed condition similar to that previously shown in FIG. 22. The upper section of the combined screen assembly and light shield member can now be collapsed around the perpendicular axis as shown in FIG. 23 by using similar methods of co-incidental fold lines on the light shield and the methods of FIGS. 24 and 25 whereby the light shield effectively takes the place of the screen material support elements of FIGS. 24 & 25. This action completed, the doubly collapsed combined assembly can now be retracted into the enclosure member as shown similarly in FIG. 26.

Mechanisms may also be attached to the base member or enclosure to further maintain or control the position of the frame elements or be used for motorising the actions of opening and closing of the screen assembly and possibly in combination with the actions to collapse the combined screen assembly and light shield assembly as described in FIGS. 29, 30 & 31.

Figure 32:
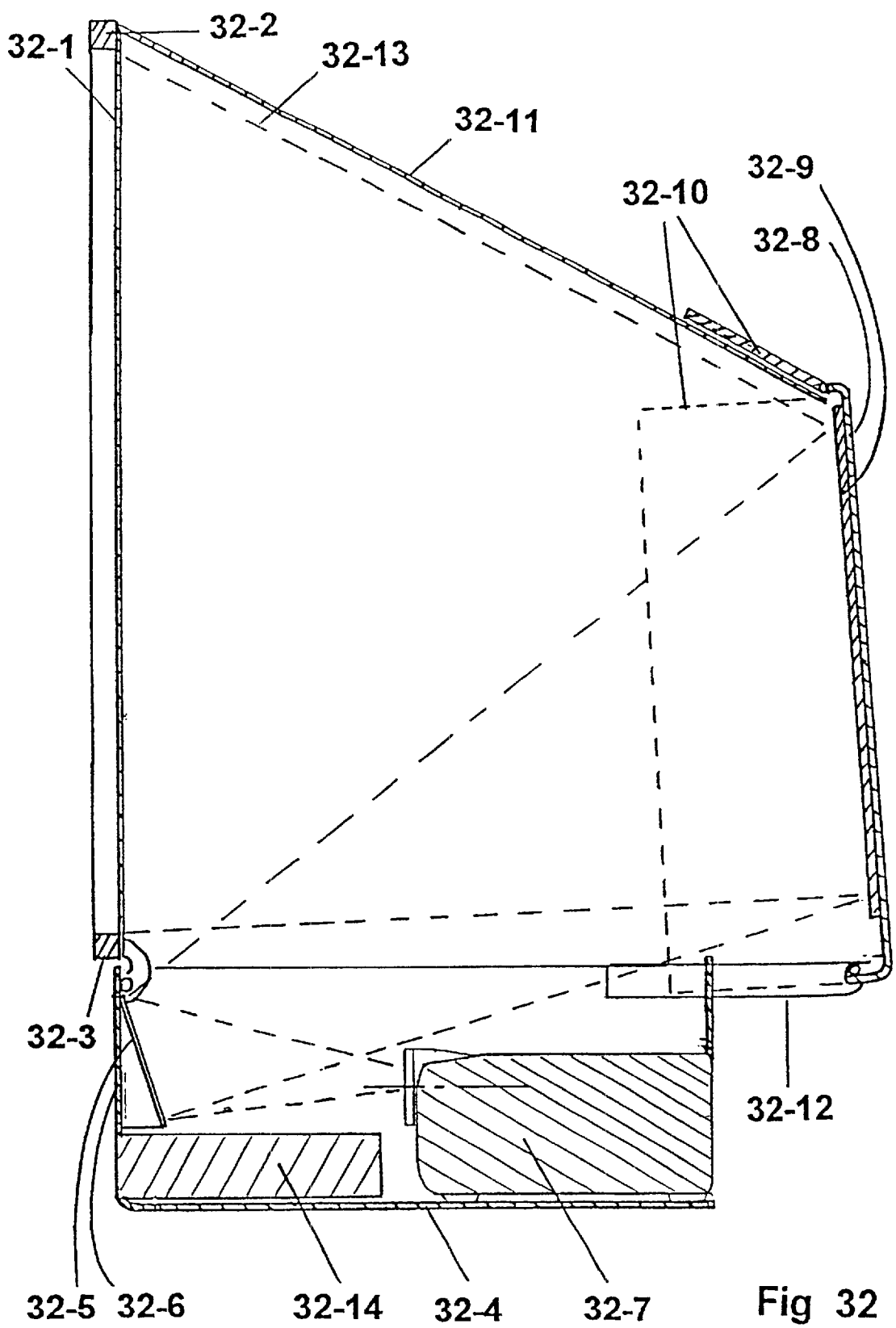
FIG. 32 is cross-sectional view along a vertical plane passing longitudinally through the centre of a device similar to that as described in FIG. 27 and exposing by way of example a suitable internal arrangement of the device.

FIG. 32. is cross-sectional view along a vertical plane passing longitudinally through the centre of a device that may be considered similar to that as described in FIG. 26 and exposing by way of example a suitable internal arrangement of the device. The screen assembly comprises of the screen member (32-1) and frame elements (32-2) & (32-3) and is hingeably mounted to the base (32-4) configured as a carrying case and also containing a mirror (32-5) mounted on an aperture door (32-6), a removable projector unit (32-7), a lid (32-8) to which is attached a further mirror (32-9). The front and sides of the lid (32-10) are attached by jointing means to the main lid section (32-8) such as to extend forward and outwards to act as a part of the existing light shield (32-11). The case also contains slides (32-12) permitting the lid to slide outwards and rearwards from the case to permit enough distance between the screen and projector along the light path (shown as dashed lines). An optional member of the case may be an audio system (not shown) and a module bay (32-14) for media such as for example TV, DVD player, memory card (i.e. a PC-Card) or say a disk based memory device.

Figure 33:
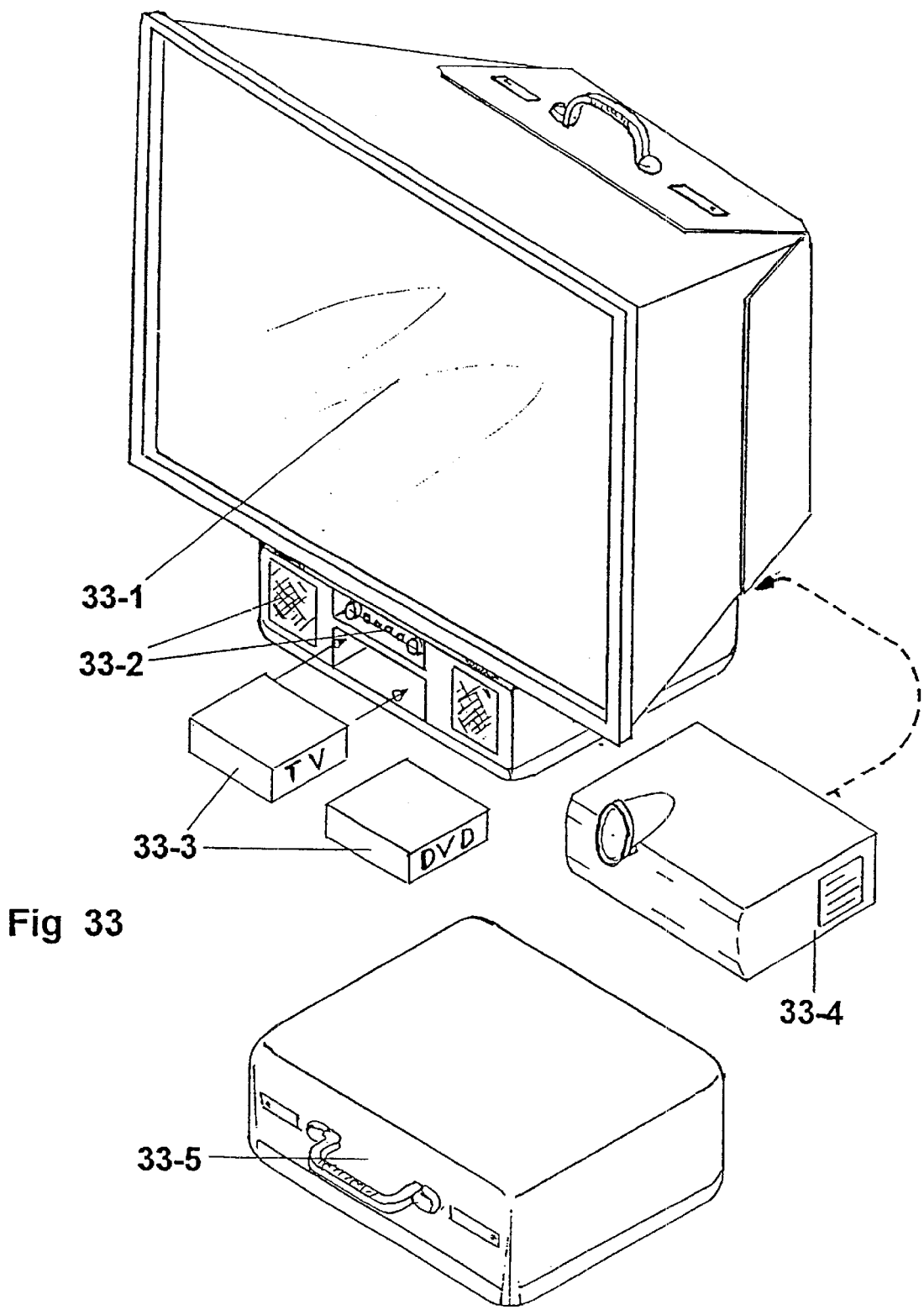
FIG. 33 is a possible embodiment showing the visual display device incorporating an audio system and "plug-in" modules to provide image media such as by a DVD player or Television tuner or PCM card similar media source and a removable projector unit.

FIG. 33 is a perspective view of a possible embodiment with the screen member (33-1) in the open condition and showing the visual display device incorporating an audio system (33-2) and "plug-in" modules (33-3) to provide image media such as by a DVD player or Television tuner or PC-card or similar media source and a removable projector unit (33-4). The format of the enclosure with all elements collapsed therein is shown as item (33-5).

Within the scope of the above described embodiments, "hinges" or "hinging", "folds" or "folding", "rotates" or "rotating" can be considered to generally refer to mechanisms or any material or mechanical property that permits that members, elements or parts thereof can move in an rotating manner relative to one another around a common real or virtual axis and whereby "slide" or "sliding" can be considered to generally refer to any material or mechanical property that permits that members, elements or parts thereof can move in any linear or longitudinal manner.

What is claimed is:

1. A collapsible rear projection screen assembly for a portable visual display device comprising a screen assembly that collapses into a closed condition suitable for easy transport by a simple folding movement between two or more screen sections and reduces or eliminates the risk of optical or physical damage to the screen member during collapsing and achieves these by comprising a flexible viewing screen member that is held to be flat by its permanent attachment to the four sides of a surrounding rectangular frame member that is composed of rigid frame elements connected by jointing means and where the jointing means feature axes of rotation that can be considered to be virtual or pseudo-virtual or that may move out of the physical section of the frame elements and thereby permitting rotation in a folding manner of up to 180 degrees between sections of the screen assembly and whereby the viewing screen member and/or its attachment means may extend outwards to at least partially overlap the frame jointing means and also whereby the elements of the jointing means by their shape or by their operation will provide a hollow into which the screen member can pass during the rotation of the jointing element to the closed position and thus avoiding potential damage to the material of the screen member by crushing or other contact.

2. A screen assembly as claims in claim 1, wherein the viewing screen member attachment means and the screen frame jointing means are essentially contained within or mounted on a rear non-visible surface of the screen frame elements.

3. A screen assembly as claimed in claim 1, wherein the screen member comprises flexible screen supporting elements that may be additional parts of integral elements of the screen attachment means that provide support to the screen member across any gaps in the attachment means associated with the jointing means between the screen frame elements.

4. A screen assembly as claimed in claim 1, wherein the jointing means, the screen frame member and the screen attachment means are configured to permit the material of the screen member to roll into a lightly rolled fold as the screen sections rotate around the axes of the jointing means to avoid damage to the physical or optical properties of the material of the viewing screen member during movement between the open and closed conditions.

5. A screen assembly as claimed in claim 1, wherein the screen assembly includes attached fold-guide elements that can be brought into a position adjacent and parallel to the axis of rotation of the screen assembly sections such as to act as a support or guide to the screen member material as it folds around the fold-guide element during the rotation of the screen assembly sections during the closing action and when in the closed condition.

6. A screen assembly as claimed in claim 1, wherein sections of the screen assembly may rotate about at least two axes of which at least two are essentially parallel.

7. A screen assembly as claimed in claim 1, wherein section of the screen assembly may rotate around two parallel axes and a third perpendicular axis.

8. A screen assembly as claimed in claim 1, wherein two axes of rotation of the screen sections intersect, the fold-guide members are configured to fold or bend in a controlled manner and parallel with the second intersecting axis of rotation such that the edge of the fold guide member and the screen material that is wrapped around it will curve into a "U" shape and whereby the edge of the base of this "U" forms an approximately semi-toroidal shape such as to permit the wrapped material of the screen member to effectively fold in two planes without pinch points or stress damage.

9. A screen assembly as claimed in claim 1, wherein frame supporting panels are attached by jointing means to the screen frame elements and each frame supporting panel is connected by jointing means to the neighboring frame supporting panel on the opposing side of each frame joint such that when the frame supporting panels are opened outwards towards an approximate perpendicular position then the connected frame supporting panels and their jointing means will effectively lock the screen assembly in the open condition.

10. A screen assembly as claimed in claim 9, wherein some or all of the axes of rotation of the jointing means between the frame supporting panel members are configured to fall essentially parallel and coincident or adjacent to the axes of the jointing means of the screen assembly when the frame supporting panel members are closed flat against the screen member thus permitting the screen assembly and frame supporting panel to fold together.

11. A screen assembly as claimed in claim 1, wherein the screen assembly is configured to deploy to the open condition or collapse to the closed condition as a complete and integral assembly.

12. A visual display device comprising a screen assembly as claimed in claim 1, wherein the screen assembly is mounted on a base member suitable for placing on any suitable surface such that the base member provides support to retain the screen assembly in an upstanding position when in the open condition and where the base member may also serve of the attachment of a projection device.

13. A visual display device comprising a screen assembly as claimed in claim 12, wherein the base member is configured to serve as a base enclosure member and is hingedly attached to the screen assembly such that the collapsed screen assembly may retract into the base enclosure member.

14. A visual display device comprising a screen assembly as claimed in claim 13, wherein the base enclosure member comprises mechanisms including mechanical or motorised means to assist or execute the opening or closing of the screen assembly.

15. A portable visual display as claimed in claim 14, wherein the base enclosure member contains projection means that may be installed integrally or installed as a removable unit.

16. A portable visual display device as claimed in claim 15, wherein the base enclosure member comprises a lid to which may be attached a mirror to fold back the light path such as to reduce the physical distance from the projection means to the viewable screen member.

17. A portable visual display device as claimed in claim 1, wherein a collapsible light shielding member is hingeably jointed to the screen assembly and in the open position extends downwards and rearwards towards the base member or projection device and is collapsible by a folding action to an initial collapsed condition adjacent to the sections of the screen assembly.

18. A portable visual display device as claimed in claim 17, wherein the light shield member in the initial collapsed condition features secondary axis of collapsing that are parallel and also adjacent or co-incidental to the axes of rotation of the screen assembly thus permitting the screen assembly and light shield member to collapse together to the closed condition by a folding action.

19. A portable visual display device as claimed in claim 18, wherein the collapsed light shielding member acts wholly or partially as a fold-guide element that is adjacent and parallel to the axis of rotation of the screen assembly sections such as to act as a support or guide to the screen member material as it wraps around the fold-guide element during the rotation of the screen assembly sections during the collapsing action and when in the closed condition.

20. A portable visual display device as claimed in claim 19, wherein the light shielding members that are jointed to the screen frame edges can act as the frame supporting panel members such as to provide mechanical support to the screen assembly when in the open position.

* * * * *